(12) United States Patent
Son et al.

(10) Patent No.: US 10,721,492 B2
(45) Date of Patent: Jul. 21, 2020

(54) INTRA PREDICTION METHOD AND DEVICE IN IMAGE CODING SYSTEM

(71) Applicant: LG Electronics Inc., Seoul (KR)

(72) Inventors: Eunyong Son, Seoul (KR); Jin Heo, Seoul (KR); Seungwook Park, Seoul (KR); Sehoon Yea, Seoul (KR)

(73) Assignee: LG Electronics Inc., Seoul (KR)

(*) Notice: Subject to any disclaimer, the term of this patent is extended or adjusted under 35 U.S.C. 154(b) by 20 days.

(21) Appl. No.: 15/762,946

(22) PCT Filed: Sep. 8, 2016

(86) PCT No.: PCT/KR2016/010062
§ 371 (c)(1),
(2) Date: Mar. 23, 2018

(87) PCT Pub. No.: WO2017/052118
PCT Pub. Date: Mar. 30, 2017

(65) Prior Publication Data
US 2018/0295384 A1    Oct. 11, 2018

Related U.S. Application Data

(60) Provisional application No. 62/222,749, filed on Sep. 23, 2015.

(51) Int. Cl.
*H04N 19/61* (2014.01)
*H04N 19/105* (2014.01)
(Continued)

(52) U.S. Cl.
CPC ........... *H04N 19/61* (2014.11); *H04N 19/105* (2014.11); *H04N 19/11* (2014.11); *H04N 19/176* (2014.11);
(Continued)

(58) Field of Classification Search
None
See application file for complete search history.

(56) References Cited

U.S. PATENT DOCUMENTS

| 9,693,054 B2* | 6/2017 | Jeon ..................... H04N 19/105 |
| 2011/0158315 A1* | 6/2011 | Kim ..................... H04N 19/124 |
| | | 375/240.03 |

(Continued)

FOREIGN PATENT DOCUMENTS

| KR | 10-2011-0073263 | 6/2011 |
| KR | 10-2011-0116025 | 10/2011 |

(Continued)

*Primary Examiner* — Mohammed Jebari
(74) *Attorney, Agent, or Firm* — Fish & Richardson P.C.

(57) ABSTRACT

An intra prediction method includes: receiving intra prediction mode information through a bitstream; deriving an intra prediction mode of a current block as a first intra directional mode on the basis of the intra prediction mode information; deriving first neighboring samples of the current block; deriving a reference sample adjacent to a target sample in the current block on the basis of a prediction direction of the first intra directional mode; deriving second neighboring samples of a neighboring block to which the reference sample belongs; determining a modified prediction direction on the basis of a comparison between the reference sample and at least one of the second neighboring samples; and deriving a prediction value for the target sample on the basis of the modified prediction direction and the first neighboring samples.

17 Claims, 12 Drawing Sheets

(51) Int. Cl.
*H04N 19/176* (2014.01)
*H04N 19/11* (2014.01)
*H04N 19/44* (2014.01)
*H04N 19/96* (2014.01)
*H04N 19/196* (2014.01)
*H04N 19/182* (2014.01)

(52) U.S. Cl.
CPC ......... *H04N 19/182* (2014.11); *H04N 19/196* (2014.11); *H04N 19/44* (2014.11); *H04N 19/96* (2014.11)

(56) References Cited

U.S. PATENT DOCUMENTS

| | | | | |
|---|---|---|---|---|
| 2012/0307894 | A1* | 12/2012 | Chien | H04N 19/176 375/240.12 |
| 2013/0136175 | A1* | 5/2013 | Wang | H04N 19/176 375/240.12 |
| 2013/0272623 | A1* | 10/2013 | Jeon | H04N 19/159 382/238 |
| 2013/0301714 | A1* | 11/2013 | Song | H04N 19/159 375/240.12 |
| 2014/0334551 | A1* | 11/2014 | Kim | H04N 19/52 375/240.16 |
| 2015/0003524 | A1* | 1/2015 | Yamamoto | H04N 19/587 375/240.12 |
| 2017/0264904 | A1* | 9/2017 | Koval | H04N 19/176 |
| 2018/0309988 | A1* | 10/2018 | Alshina | H04N 19/102 |

FOREIGN PATENT DOCUMENTS

| | | |
|---|---|---|
| KR | 10-2012-0065953 | 6/2012 |
| KR | 10-2013-0029130 | 3/2013 |
| KR | 10-2013-0126928 | 11/2013 |
| KR | 10-2015-0081240 | 7/2015 |

* cited by examiner (a)

(b)

(a)

(b)

(a)           (b)

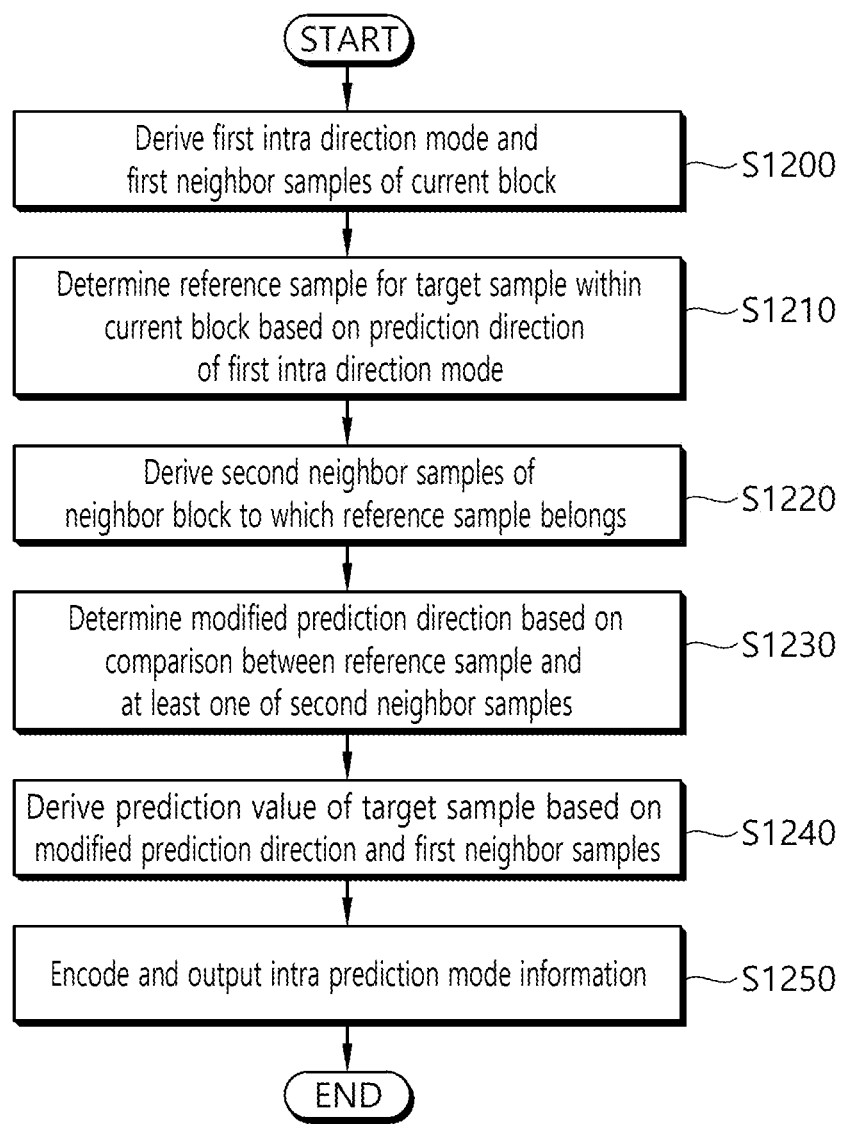

INTRA PREDICTION METHOD AND DEVICE IN IMAGE CODING SYSTEM

CROSS-REFERENCE TO RELATED APPLICATIONS

This application is a National Stage application under 35 U.S.C. § 371 of International Application No. PCT/KR2016/010062, filed Sep. 8, 2016, which claims the benefit of U.S. Application No. 62/222,749, filed on Sep. 23, 2015. The disclosures of the prior applications are incorporated by reference in their entirety.

BACKGROUND

Field of the Invention

The present invention relates to an image coding technique, and more specifically, to an intra-prediction method and device in an image coding system.

Related Art

A demand for high-resolution and high-quality images, such as high definition (HD) images and ultra-high definition (UHD) images, has been increasing in various fields. As the image data has high resolution and high quality, the amount of information or bits to be transmitted increases relative to the legacy image data. Therefore, when image data is transmitted using a medium such as a conventional wired/wireless broadband line or image data is stored using an existing storage medium, the transmission cost and the storage cost thereof are increased.

Accordingly, there is a need for a highly efficient image compression technique for effectively transmitting, storing, and reproducing information of high resolution and high quality images.

SUMMARY

An object of the present invention is to provide a method and device for improving inter-prediction efficiency.

An object of the present invention is to provide a method and apparatus for adaptively deriving the split direction of a block.

An object of the present invention is to provide a method and apparatus for adjusting a prediction direction in a simple unit within a block.

Another object of the present invention is to provide a method and apparatus for adjusting a prediction direction in a lower block unit.

In accordance with an embodiment of the present invention, there is provided an intra prediction method performed by a decoding apparatus. The intra prediction method includes the steps of receiving intra prediction mode information through a bit stream, deriving the intra prediction mode of a current block as a first intra direction mode based on the intra prediction mode information, deriving first neighbor samples of the current block, deriving a reference sample neighboring a target sample within the current block based on the prediction direction of the first intra direction mode, deriving second neighbor samples of a neighbor block to which the reference sample belongs, determining a modified prediction direction based on a comparison between the reference sample and at least one of the second neighbor samples, and deriving the prediction value of the target sample based on the modified prediction direction and the first neighbor samples.

In accordance with an embodiment of the present invention, there is provided an intra prediction method performed by an encoding apparatus. The intra prediction method includes the steps of deriving a first intra direction mode and first neighbor samples of a current block, determining a reference sample neighboring a target sample within the current block based on a prediction direction of the first intra direction mode, deriving second neighbor samples of a neighbor block to which the reference sample belongs, determining a modified prediction direction based on a comparison between the reference sample and at least one of the second neighbor samples, deriving a prediction value of the target sample based on the modified prediction direction and the first neighbor samples, and encoding and outputting intra prediction mode information indicative of the first intra direction mode.

In accordance with yet another embodiment of the present invention, there is provided a decoding apparatus performing intra prediction. The decoding apparatus includes an entropy decoding unit receiving intra prediction mode information through a bit stream, and a prediction unit deriving the intra prediction mode of a current block as a first intra direction mode based on the intra prediction mode information, deriving first neighbor samples of the current block, deriving a reference sample neighboring a target sample within the current block based on the prediction direction of the first intra direction mode, deriving second neighbor samples of a neighbor block to which the reference sample belongs, determining a modified prediction direction based on a comparison between the reference sample and at least one of the second neighbor samples, and deriving the prediction value of the target sample based on the modified prediction direction and the first neighbor samples.

In accordance with yet another embodiment of the present invention, there is provided an encoding apparatus performing intra prediction. The encoding apparatus includes a prediction unit deriving a first intra direction mode and first neighbor samples of a current block, determining a reference sample neighboring a target sample within the current block based on a prediction direction of the first intra direction mode, deriving second neighbor samples of a neighbor block to which the reference sample belongs, determining a modified prediction direction based on a comparison between the reference sample and at least one of the second neighbor samples, and deriving a prediction value of the target sample based on the modified prediction direction and the first neighbor samples, and an entropy encoding unit encoding and outputting intra prediction mode information indicative of the first intra direction mode.

In accordance with the present invention, a reference sample of the target sample of a current block can be selected based on an intra prediction mode, thereby being capable of improving intra prediction performance.

In accordance with the present invention, a prediction direction can be adjusted in a simple unit within a current block, and the accuracy of prediction can be increased using an optimal intra prediction direction in a simple unit. Accordingly, the amount of data of a residual signal can be reduced and overall coding efficiency can be improved.

BRIEF DESCRIPTION OF THE DRAWINGS

FIG. 12 schematically shows an intra prediction method of an encoding apparatus according to the present invention.

DETAILED DESCRIPTION

Figure 1:
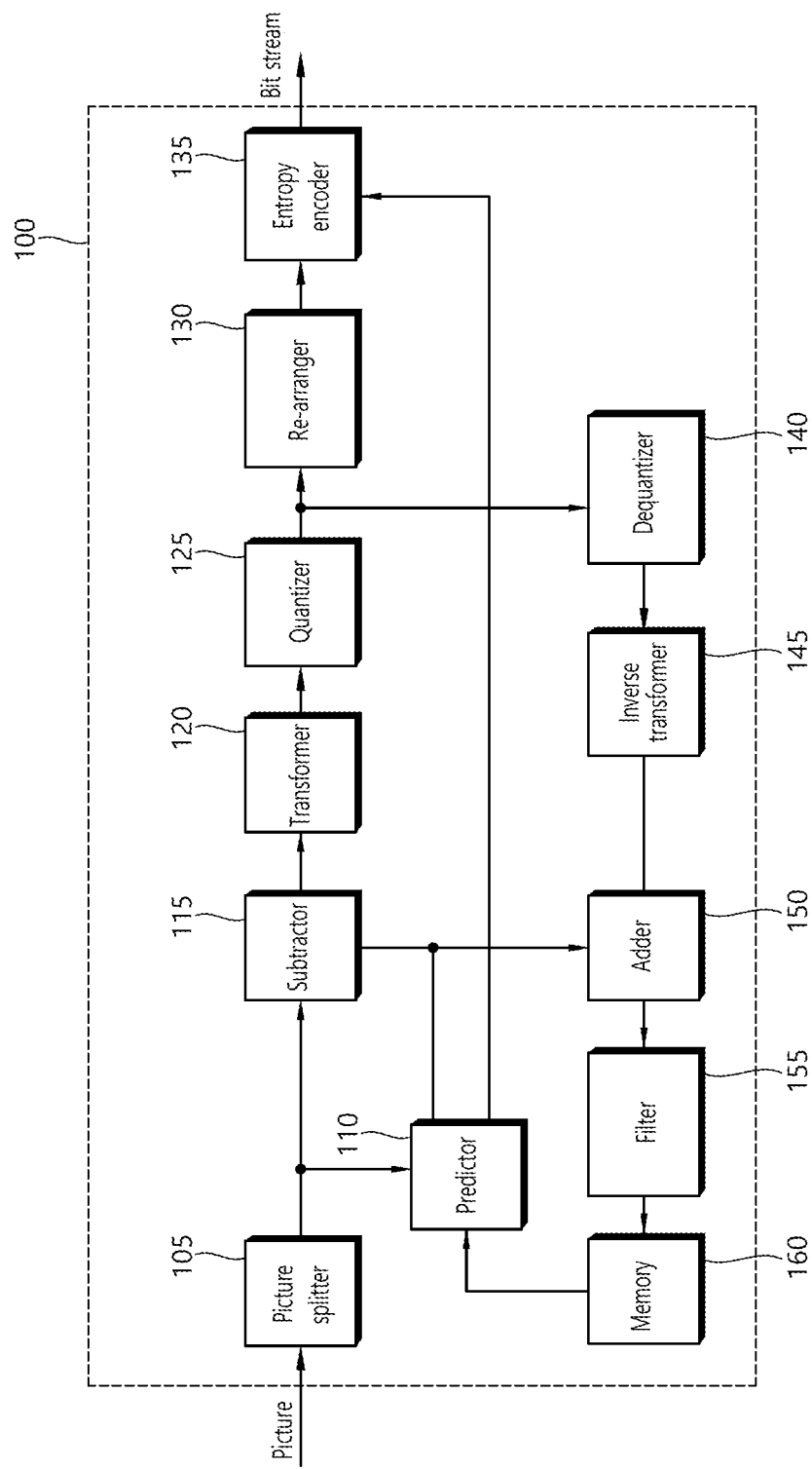
FIG. 1 is a diagram schematically illustrating the configuration of a video encoding apparatus to which the present invention may be applied.

The present invention may be modified in various forms, and specific embodiments thereof will be described and illustrated in the drawings. However, the embodiments are not intended for limiting the invention. The terms used in the following description are used to merely describe specific embodiments, but are not intended to limit the invention. An expression of a singular number includes an expression of the plural number, so long as it is clearly read differently. The terms such as "include" and "have" are intended to indicate that features, numbers, steps, operations, elements, components, or combinations thereof used in the following description exist and it should be thus understood that the possibility of existence or addition of one or more different features, numbers, steps, operations, elements, components, or combinations thereof is not excluded.

Meanwhile, elements in the drawings described in the invention are independently drawn for the purpose of convenience for explanation of different specific functions, and do not mean that the elements are embodied by independent hardware or independent software. For example, two or more elements of the elements may be combined to form a single element, or one element may be divided into plural elements. The embodiments in which the elements are combined and/or divided belong to the invention without departing from the concept of the invention.

Hereinafter, embodiments of the present invention will be described in detail with reference to the accompanying drawings. In addition, like reference numerals are used to indicate like elements throughout the drawings, and the same descriptions on the like elements will be omitted.

In the present specification, generally a picture means a unit representing an image at a specific time, a slice is a unit constituting a part of the picture. One picture may be composed of plural slices, and the terms of a picture and a slice may be mixed with each other as occasion demands.

A pixel or a pel may mean a minimum unit constituting one picture (or image). Further, a 'sample' may be used as a term corresponding to a pixel. The sample may generally represent a pixel or a value of a pixel, may represent only a pixel (a pixel value) of a luma component, and may represent only a pixel (a pixel value) of a chroma component.

A unit indicates a basic unit of image processing. The unit may include at least one of a specific area and information related to the area. Optionally, the unit may be mixed with terms such as a block, an area, or the like. In a typical case, an M×N block may represent a set of samples or transform coefficients arranged in M columns and N rows.

FIG. 1 briefly illustrates a structure of a video encoding device to which the present invention is applicable.

Referring to FIG. 1, a video encoding device 100 includes a picture splitter 105, a prediction unit 110, a subtractor 115, a transform unit 120, a quantization unit 125, a re-arrangement unit 130, an entropy encoder 135, a dequantization unit 140, an inverse transform unit 145, an adder 150, a filter 155, and memory 160.

The picture splitter 105 may split an input picture into at least one processing unit. Here, a processing unit may be a coding unit (CU), a prediction unit (PU) or a transform unit (TU). The coding unit is a unit block of coding and a largest coding unit (LCU) may be split into coding units of deeper depth according to a quad-tree structure. In this case, the largest coding unit may be used as a final coding unit or a coding unit may be recursively split into coding units of deeper depth as necessary and a coding unit having an optimal size may be used as a final coding unit on the basis of coding efficiency according to video characteristics. When a smallest coding unit (SCU) is set, a coding unit cannot be split into a coding unit smaller than the smallest coding unit. Here, the final coding unit refers to a coding unit partitioned or split into a prediction unit or a transform unit. A prediction unit is a block partitioned from a coding unit block and may be a unit block of sample prediction. Here, the prediction unit may be divided into sub blocks. A transform block can be split from a coding unit block according to the quad-tree structure and may be a unit block that derives a transform coefficient and/or a unit block that derives a residual signal from a transform coefficient.

Hereinafter, the coding unit may be called a coding block (CB), the prediction unit may be called a prediction block (PB), and the transform unit may be called a transform block (TB).

The prediction block or the prediction unit may mean a specific area having a block shape in a picture, and may include an array of a prediction sample. Further, the transform block or the transform unit may mean a specific area having a block shape in a picture, and may include a transform coefficient or an array of a residual sample.

The prediction unit 110 may perform prediction on a processing target block (hereinafter, a current block), and may generate a prediction block including prediction samples for the current block. A unit of prediction performed in the prediction unit 110 may be a coding block, or may be a transform block, or may be a prediction block.

The prediction unit 110 may determine whether intra-prediction is applied or inter-prediction is applied to the current block. For example, the prediction unit 110 may determine whether the intra-prediction or the inter-prediction is applied in unit of CU.

In case of the intra-prediction, the prediction unit 110 may derive a prediction sample for the current block on the basis of a reference sample outside the current block in a picture to which the current block belongs (hereinafter, a current picture). In this case, the prediction unit 110 may derive the prediction sample on the basis of an average or interpolation of neighboring reference samples of the current block (case (i)), or may derive the prediction sample on the basis of a reference sample existing in a specific (prediction) direction as to a prediction sample among the neighboring reference samples of the current block (case (ii)). The case (i) may be called a non-directional mode or a non-angular mode, and the case (ii) may be called a directional mode or an angular mode. In the intra-prediction, prediction modes may include as an example 33 directional modes and at least two non-directional modes. The non-directional modes may include DC mode and planar mode. The prediction unit 110 may determine the prediction mode to be applied to the current block by using the prediction mode applied to the neighboring block.

In case of the inter-prediction, the prediction unit 110 may derive the prediction sample for the current block on the basis of a sample specified by a motion vector on a reference picture. The prediction unit 110 may derive the prediction sample for the current block by applying any one of a skip mode, a merge mode, and a motion vector prediction (MVP) mode. In case of the skip mode and the merge mode, the prediction unit 110 may use motion information of the neighboring block as motion information of the current block. In case of the skip mode, unlike in the merge mode, a difference (residual) between the prediction sample and an original sample is not transmitted. In case of the MVP mode, a motion vector of the neighboring block is used as a motion vector prediction unit and thus is used as a motion vector prediction unit of the current block to derive a motion vector of the current block.

In case of the inter-prediction, the neighboring block may include a spatial neighboring block existing in the current picture and a temporal neighboring block existing in the reference picture. The reference picture including the temporal neighboring block may also be called a collocated picture (colPic). Motion information may include the motion vector and a reference picture index. Information such as prediction mode information and motion information may be (entropy) encoded, and then output as a form of a bit stream.

When motion information of a temporal neighboring block is used in the skip mode and the merge mode, a highest picture in a reference picture list may be used as a reference picture. Reference pictures included in the reference picture list may be aligned on the basis of a picture order count (POC) difference between a current picture and a corresponding reference picture. A POC corresponds to a display order and can be discriminated from a coding order.

The subtractor 115 generates a residual sample which is a difference between an original sample and a prediction sample. If the skip mode is applied, the residual sample may not be generated as described above.

The transform unit 120 transforms residual samples in units of a transform block to generate a transform coefficient. The transform unit 120 may perform transformation on the basis of the size of a corresponding transform block and a prediction mode applied to a coding block or prediction block spatially overlapping with the transform block. For example, residual samples can be transformed using discrete sine transform (DST) if intra-prediction is applied to the coding block or the prediction block overlapping with the transform block and the transform block is a 4×4 residual array and is transformed using discrete cosine transform (DCT) in other cases.

The quantization unit 125 may quantize the transform coefficients to generate a quantized transform coefficient.

The re-arrangement unit 130 rearranges quantized transform coefficients. The re-arrangement unit 130 may rearrange the quantized transform coefficients in the form of a block into a one-dimensional vector through a coefficient scanning method. Although the re-arrangement unit 130 is described as a separate component, the re-arrangement unit 130 may be a part of the quantization unit 125.

The entropy encoder 135 may perform entropy-encoding on the quantized transform coefficients. The entropy encoding may include an encoding method, for example, an exponential Golomb, a context-adaptive variable length coding (CAVLC), a context-adaptive binary arithmetic coding (CABAC), or the like. The entropy encoder 135 may perform encoding together or separately on information (e.g., a syntax element value) required for video reconstruction in addition to the quantized transform coefficients. The entropy-encoded information may be transmitted or stored in unit of a network abstraction layer (NAL) in a bit stream form.

The dequantization unit 140 dequantizes values (transform coefficients) quantized by the quantization unit 125 and the inverse transform unit 145 inversely transforms values dequantized by the dequantization unit 135 to generate a residual sample.

The adder 150 adds a residual sample to a prediction sample to reconstruct a picture. The residual sample may be added to the prediction sample in units of a block to generate a reconstructed block. Although the adder 150 is described as a separate component, the adder 150 may be a part of the prediction unit 110.

The filter 155 may apply deblocking filtering and/or a sample adaptive offset to the reconstructed picture. Artifacts at a block boundary in the reconstructed picture or distortion in quantization can be corrected through deblocking filtering and/or sample adaptive offset. Sample adaptive offset may be applied in units of a sample after deblocking filtering is completed. The filter 155 may apply an adaptive loop filter (ALF) to the reconstructed picture. The ALF may be applied to the reconstructed picture to which deblocking filtering and/or sample adaptive offset has been applied.

The memory 160 may store a reconstructed picture or information necessary for encoding/decoding. Here, the reconstructed picture may be the reconstructed picture filtered by the filter 155. The stored reconstructed picture may be used as a reference picture for (inter) prediction of other pictures. For example, the memory 160 may store (reference) pictures used for inter-prediction. Here, pictures used for inter-prediction may be designated according to a reference picture set or a reference picture list.

Figure 2:
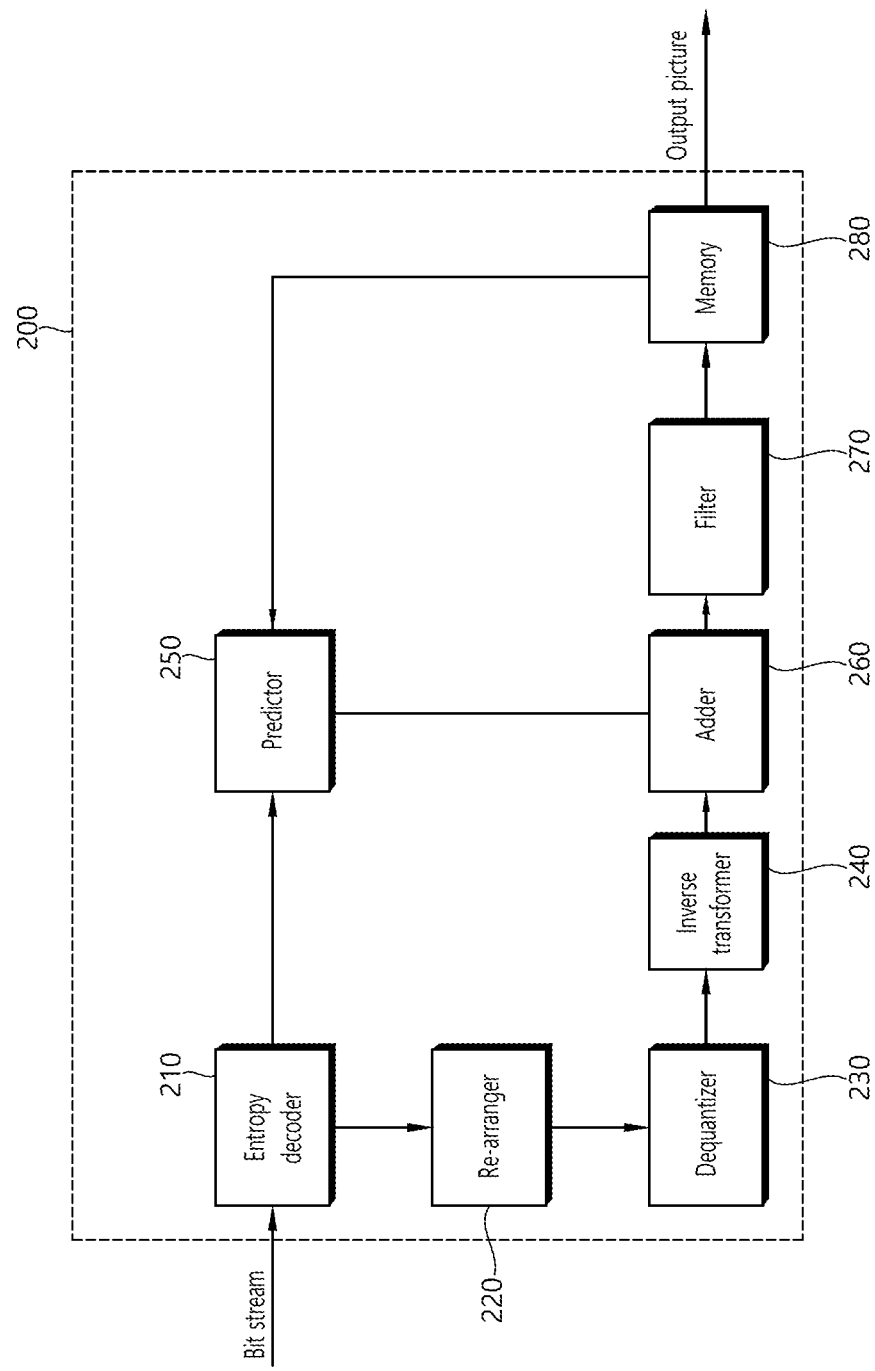
FIG. 2 is a diagram schematically illustrating the configuration of a video decoding apparatus to which the present invention may be applied.

FIG. 2 briefly illustrates a structure of a video decoding device to which the present invention is applicable.

Referring to FIG. 2, a video decoding device 200 includes an entropy decoder 210, a re-arrangement unit 220, a dequantization unit 230, an inverse transform unit 240, a prediction unit 250, an adder 260, a filter 270, and memory 280.

When a bit stream including video information is input, the video decoding device 200 may reconstruct a video in association with a process by which video information is processed in the video encoding device.

For example, the video decoding device 200 may perform video decoding by using a processing unit applied in the video encoding device. Therefore, the processing unit block of video decoding may be a coding unit block, a prediction unit block, or a transform unit block. As a unit block of decoding, the coding unit block may be split according to a quad tree structure from a largest coding unit block. As a block partitioned from the coding unit block, the prediction unit block may be a unit block of sample prediction. In this case, the prediction unit block may be divided into sub blocks. As a coding unit block, the transform unit block may be split according to the quad tree structure, and may be a unit block for deriving a transform coefficient or a unit block for deriving a residual signal from the transform coefficient.

The entropy decoder 210 may parse the bit stream to output information required for video reconstruction or picture reconstruction. For example, the entropy decoder 210 may decode information in the bit stream on the basis of a coding method such as exponential Golomb encoding, CAVLC, CABAC, or the like, and may output a value of a syntax element required for video reconstruction and a quantized value of a transform coefficient regarding a residual.

More specifically, a CABAC entropy decoding method can receive a bin corresponding to each syntax element in a bit stream, determine a context model using decoding target syntax element information and decoding information of neighboring and decoding target blocks or information of a symbol/bin decoded in a previous step, predict bin generation probability according to the determined context model and perform arithmetic decoding of the bin to generate a symbol corresponding to each syntax element value. Here, the CABAC entropy decoding method can update the context model using information of a symbol/bin decoded for a context model of the next symbol/bin after determination of the context model.

Information about prediction among information decoded in the entropy decoder 210 may be provided to the prediction unit 250 and residual values, that is, quantized transform coefficients, on which entropy decoding has been performed by the entropy decoder 210 may be input to the re-arrangement unit 220.

The re-arrangement unit 220 may rearrange the quantized transform coefficients into a two-dimensional block form. The re-arrangement unit 220 may perform rearrangement corresponding to coefficient scanning performed by the encoding device. Although the re-arrangement unit 220 is described as a separate component, the re-arrangement unit 220 may be a part of the quantization unit 230.

The dequantization unit 230 may de-quantize the quantized transform coefficients on the basis of a (de)quantization parameter to output a transform coefficient. In this case, information for deriving a quantization parameter may be signaled from the encoding device.

The inverse transform unit 240 may inverse-transform the transform coefficients to derive residual samples.

The prediction unit 250 may perform prediction on a current block, and may generate a prediction block including prediction samples for the current block. A unit of prediction performed in the prediction unit 250 may be a coding block or may be a transform block or may be a prediction block.

The prediction unit 250 may determine whether to apply intra-prediction or inter-prediction based on information on a prediction. In this case, a unit for determining which one will be used between the intra-prediction and the inter-prediction may be different from a unit for generating a prediction sample. In addition, a unit for generating the prediction sample may also be different in the inter-prediction and the intra-prediction. For example, which one will be applied between the inter-prediction and the intra-prediction may be determined in unit of CU. Further, for example, in the inter-prediction, the prediction sample may be generated by determining the prediction mode in unit of PU, and in the intra-prediction, the prediction sample may be generated in unit of TU by determining the prediction mode in unit of PU.

In case of the intra-prediction, the prediction unit 250 may derive a prediction sample for a current block on the basis of a neighboring reference sample in a current picture. The prediction unit 250 may derive the prediction sample for the current block by applying a directional mode or a non-directional mode on the basis of the neighboring reference sample of the current block. In this case, a prediction mode to be applied to the current block may be determined by using an intra-prediction mode of a neighboring block.

In the case of inter-prediction, the prediction unit 250 may derive a prediction sample for a current block on the basis of a sample specified in a reference picture according to a motion vector. The prediction unit 250 may derive the prediction sample for the current block using one of the skip mode, the merge mode and the MVP mode. Here, motion information required for inter-prediction of the current block provided by the video encoding device, for example, a motion vector and information about a reference picture index may be acquired or derived on the basis of the information about prediction.

In the skip mode and the merge mode, motion information of a neighboring block may be used as motion information of the current block. Here, the neighboring block may include a spatial neighboring block and a temporal neighboring block.

The prediction unit 250 may construct a merge candidate list using motion information of available neighboring blocks and use information indicated by a merge index on the merge candidate list as a motion vector of the current block. The merge index may be signaled by the encoding device. Motion information may include a motion vector and a reference picture. When motion information of a temporal neighboring block is used in the skip mode and the merge mode, a highest picture in a reference picture list may be used as a reference picture.

In the case of the skip mode, a difference (residual) between a prediction sample and an original sample is not transmitted, distinguished from the merge mode.

In the case of the MVP mode, the motion vector of the current block may be derived using a motion vector of a neighboring block as a motion vector prediction unit. Here, the neighboring block may include a spatial neighboring block and a temporal neighboring block.

When the merge mode is applied, for example, a merge candidate list can be generated using a motion vector of a reconstructed spatial neighboring block and/or a motion vector corresponding to a Col block which is a temporal neighboring block. A motion vector of a candidate block selected from the merge candidate list is used as the motion vector of the current block in the merge mode. The aforementioned information about prediction may include a merge index indicating a candidate block having the best motion vector selected from candidate blocks included in the merge candidate list. Here, the prediction unit 250 may derive the motion vector of the current block using the merge index.

When the motion vector prediction (MVP) mode is applied as another example, a motion vector prediction unit candidate list may be generated using a motion vector of a reconstructed spatial neighboring block and/or a motion vector corresponding to a Col block which is a temporal neighboring block. That is, the motion vector of the reconstructed spatial neighboring block and/or the motion vector corresponding to the Col block which is the temporal neighboring block may be used as motion vector candidates. The aforementioned information about prediction may include a prediction motion vector index indicating the best motion vector selected from motion vector candidates included in the list. Here, the prediction unit 250 may select a prediction motion vector of the current block from the motion vector candidates included in the motion vector candidate list using the motion vector index. The prediction unit of the encoding device may obtain a motion vector difference (MVD) between the motion vector of the current block and a motion vector prediction unit, encode the MVD and output the encoded MVD in the form of a bit stream. That is, the MVD can be obtained by subtracting the motion vector prediction unit from the motion vector of the current block. Here, the prediction unit 250 may acquire a motion vector included in the information about prediction and derive the motion vector of the current block by adding the motion vector difference to the motion vector prediction unit. In addition, the prediction unit may obtain or derive a reference picture index indicating a reference picture from the aforementioned information about prediction.

The adder 260 can add a residual sample to a prediction sample to reconstruct a current block or a current picture. The adder 260 may reconstruct the current picture by adding the residual sample to the prediction sample in units of a block. When the skip mode is applied, a residual is not transmitted and thus the prediction sample may become a reconstructed sample. Although the adder 260 is described as a separate component, the adder 260 may be a part of the prediction unit 250.

The filter 270 may apply deblocking filtering, sample adaptive offset and/or ALF to the reconstructed picture. Here, sample adaptive offset may be applied in units of a sample after deblocking filtering. The ALF may be applied after deblocking filtering and/or application of sample adaptive offset.

The memory 280 may store a reconstructed picture or information necessary for decoding. Here, the reconstructed picture may be the reconstructed picture filtered by the filter 270. For example, the memory 280 may store pictures used for inter-prediction. Here, the pictures used for inter-prediction may be designated according to a reference picture set or a reference picture list. A reconstructed picture may be used as a reference picture for other pictures. The memory 280 may output reconstructed pictures in an output order.

As described above, in order to improve coding efficiency, inter prediction or intra prediction may be performed. In particular, in the intra prediction, an intra prediction mode may be determined in the unit of a prediction unit, and a prediction sample may be derived using neighbor reference samples in the unit of a transform unit. In this case, one or more transform units may be included in one prediction unit. The one or more transform units may share the same intra prediction mode.

In the encoding apparatus, a maximum and minimum transform unit size may be determined based on the characteristics (e.g., resolution) of a video image or by taking into consideration coding efficiency, and information about the maximum and minimum transform unit size or information capable of deriving maximum and minimum transform unit size may be included in a bit stream. Furthermore, a transform unit having a tree structure may be hierarchically spit with depth information. Each split lower transform unit may have depth information. The depth information indicates the number of times and/or the degree that a coding unit has been split, and thus may include information about the size of a lower transform unit. The decoding apparatus may obtain split information indicating whether a current transform unit has been split.

Information indicating whether a corresponding transform unit is split may be designated with respect to one transform unit. For example, when the value of a split flag indicating whether a transform unit is split is 1, the corresponding transform unit is split into four transform units. When the value of the split flag is 0, the corresponding transform unit is no longer split, and a processing process for the corresponding transform unit may be performed. Prediction and transform may be performed based on the corresponding transform unit.

The split structure of the aforementioned transform unit may be indicated using a tree structure. For example, split may be performed using a transform unit overlapping a prediction unit as a root. A transform unit that is now split becomes a parent node, and a transform unit split from the parent node becomes a child node. In this case, the transform unit (parent node) that is now split has child nodes corresponding to the number of split transform units. Furthermore, a transform unit that is no longer split becomes a leaf node. The leaf node refers to a node not having a child node.

Assuming that square split is performed on one transform unit, one transform unit may be split into a maximum of lower transform units. Accordingly, the split structure of the transform unit may be a quad tree structure.

Meanwhile, block split according to the present invention includes the block split of the aforementioned square structure and may also include various non-square splits in addition to square split or may include a combination of splits of a square and non-square form. If a current block is one of non-square transform units (TU), it may be split from a coding unit along the quad-tree structure.

Figure 3:
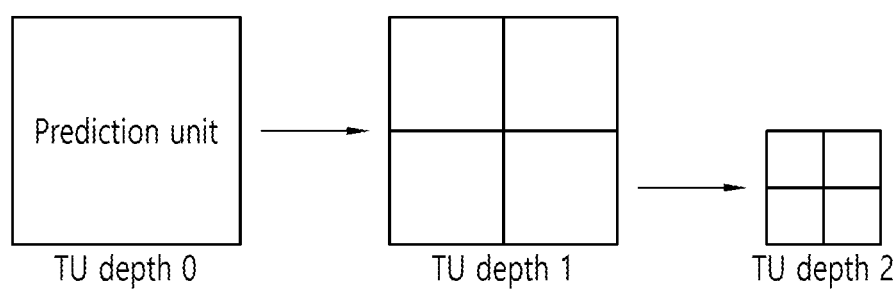
FIG. 3 illustrates a method of splitting TUs based on a quad-tree structure.
Figure 3:
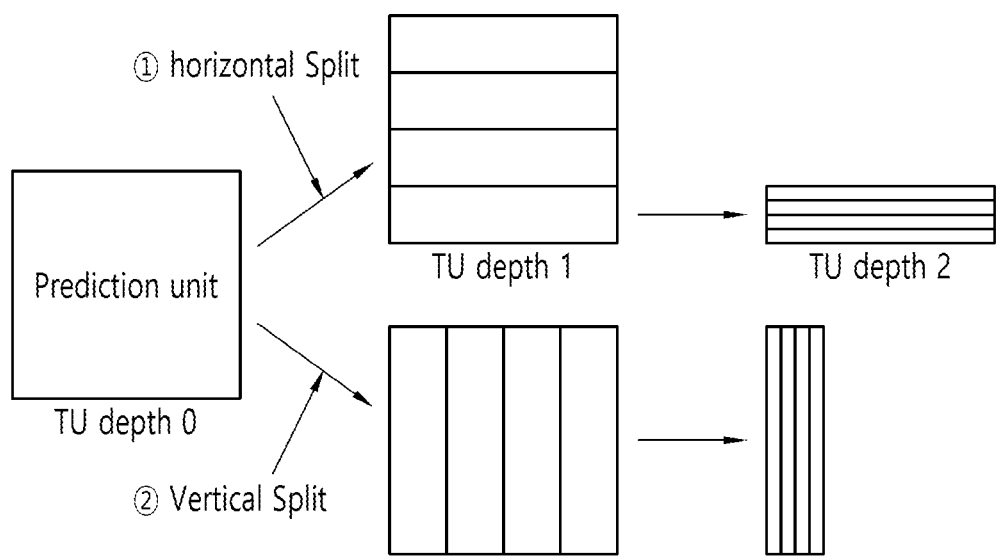

FIG. 3 illustrates a method of splitting TUs based on a quad-tree structure.

A prediction unit (PU) shown in FIGS. 3(a) and 3(b) is a unit in which prediction is performed, that is, a unit in which a prediction mode is determined. If intra prediction is applied, in general, an intra prediction mode may include 35 prediction modes.

TABLE 1

| Intra prediction mode | Associated name |
| --- | --- |
| 0 | Intra planar |
| 1 | Intra DC |
| 2, . . . , 34 | Intra angular 2, . . . , Intra angular 34 |

In this case, 0 to 34 indicate the indices of the intra prediction modes. The intra prediction mode #0 indicates an intra planar mode, and the intra prediction mode #1 indicates an intra DC mode. The intra prediction modes #2, . . . , #34 indicate an intra angular 2 mode, . . . , an intra angular 34 mode, respectively. In this case, the intra planar mode and the intra DC mode may be called intra non-directional modes, and the intra angular 2 mode to the intra angular 34 mode may be called intra directional modes. If intra prediction is applied to the PU shown in FIG. 3, one of the aforementioned intra prediction modes may be applied to the PU.

In this case, as described above, one PU may include one or more TUs. The one or more TUs may share the same intra prediction mode.

FIG. 3(a) shows that a TU having the same size and position as a PU is split into a plurality of square TUs. One TU may be split into four TUs having the same size in the line in which a TU is vertically split from a point half the width and the line which the TU is horizontally split from a point half the TU height.

FIG. 3(b) shows that a TU having the size and position as a PU is split into non-square TUs. A vertical split method of splitting one TU into a plurality of TUs through a vertically split line may be selected, or a horizontal split method of splitting one TU into a plurality of TUs through a horizontally split line may be selected. The split method shown in FIG. 3(b) is partially similar to a method of partitioning a coding unit (CU) of short distance intra prediction (SDIP) into PUs, but the method is a method of splitting a TU and is different from the SDIP method in terms of an application target. Furthermore, the split method is different from the conventional TU split method in that one TU can be split into square TUs only in a quad-tree structure.

In FIG. 3(b), the split method selected when the depth increases from 0 to 1 is divided into a vertical split method and a horizontal split method. A method of selecting the split method may be various. For example, the decoding apparatus may receive a flag regarding a split method from a bit stream, for example, a vertical split flag, and may check the split method. When the value of the vertical split flag is 1, the decoding apparatus may split a PU using the vertical split method. When the value of the block split flag is 0, the decoding apparatus may split a PU using the horizontal split method. However, when the value is 1, the decoding apparatus may select the horizontal split method. When the value is 0, the decoding apparatus may receive a horizontal split flag that enables the vertical split method to be selected.

Furthermore, the decoding apparatus may split the split method for each intra prediction mode applied in a PU including the region of a current TU.

Figure 4:
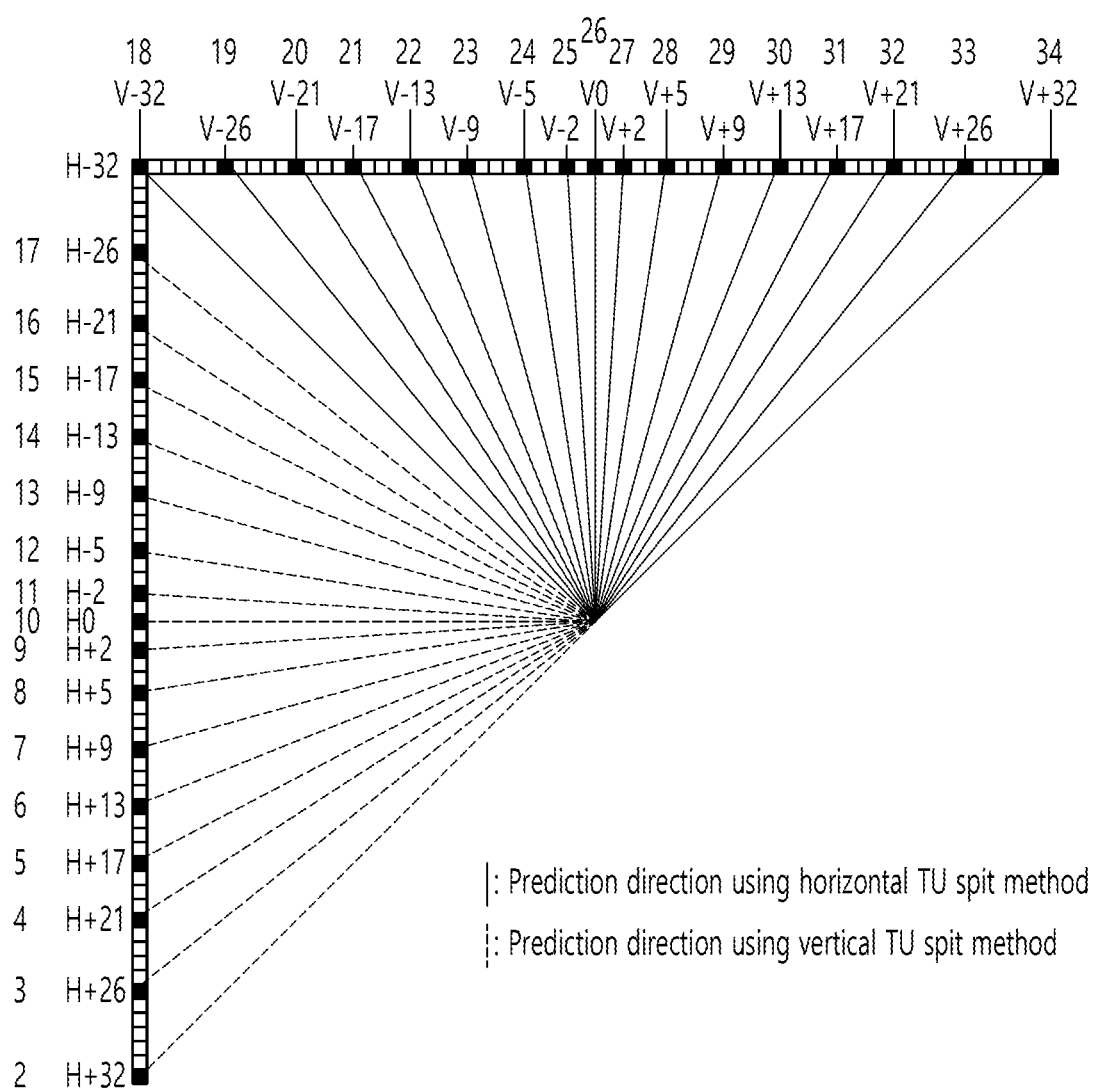
FIG. 4 illustrates the state in which intra prediction modes according to split methods are classified.

FIG. 4 illustrates the state in which intra prediction modes according to split methods are classified.

FIG. 4 shows an embodiment in which a split method of a TU is classified for each intra directional mode. When the prediction direction of a No. 10 intra directional mode is viewed in a horizontal direction, the decoding apparatus may select the vertical split method when Nos. 2 to 17 intra directional modes close to the horizontal direction are applied. Furthermore, when the prediction direction of a No. 26 intra directional mode is viewed in a vertical direction, the decoding apparatus may select the horizontal split method when Nos. 18 to 34 intra directional modes close to the vertical direction are applied.

Meanwhile, in the present invention, an intra prediction direction may be adjusted for each sample of a TU split into non-square blocks. In other words, in accordance with the present invention, the intra prediction direction may be refined in a sample unit. That is, in accordance with the present invention, the decoding apparatus may derive a modified intra prediction direction for each sample of a TU having a w×N($1 \leq w < N$) or N×h($1 \leq h < N$) size which has been split using the aforementioned split method.

Figure 5:
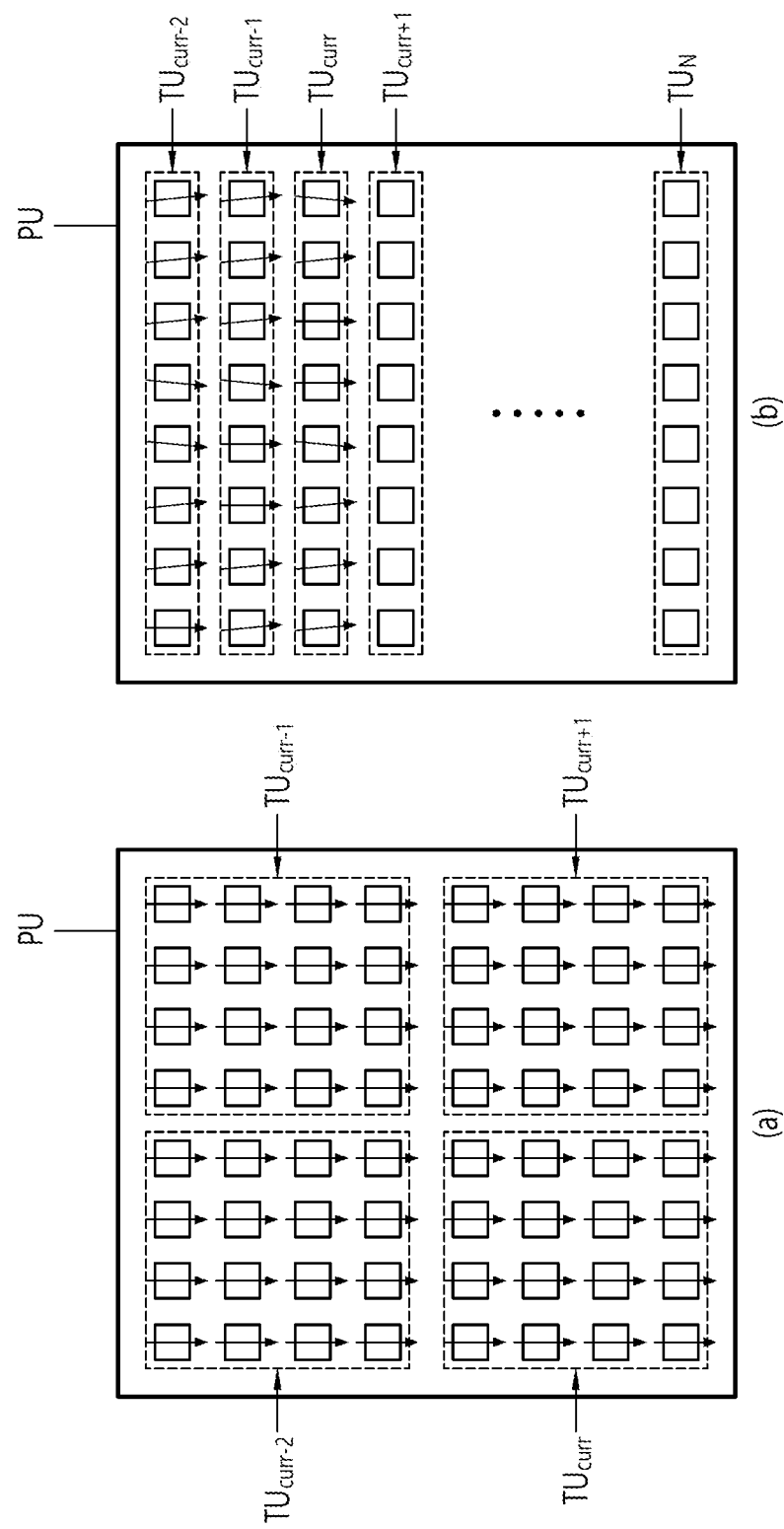
FIG. 5 illustrates an intra prediction direction in each sample in a square split method and an intra prediction direction in each sample in a non-square split method.

FIG. 5 illustrates an intra prediction direction in each sample in a square split method and an intra prediction direction in each sample in a non-square split method.

FIG. 5 shows a difference between an intra prediction mode direction for each sample of a square TU and an intra prediction mode direction for each sample of a non-square TU. If the square split method has been applied, intra prediction mode information is transmitted in a PU unit. Although a plurality of TUs is included in a PU region, the TUs may be decoded by applying the same intra prediction mode.

Meanwhile, if the non-square split method has been applied, intra prediction mode information is transmitted in a PU unit as in the case where the square split method has been applied, but a prediction direction may be modified so that it has the most suitable intra prediction direction for each sample within TUs. Furthermore, in this case, the decoding apparatus may classify the non-square split method based on the angle of an intra prediction direction applied to the PU as described above.

Figure 6:
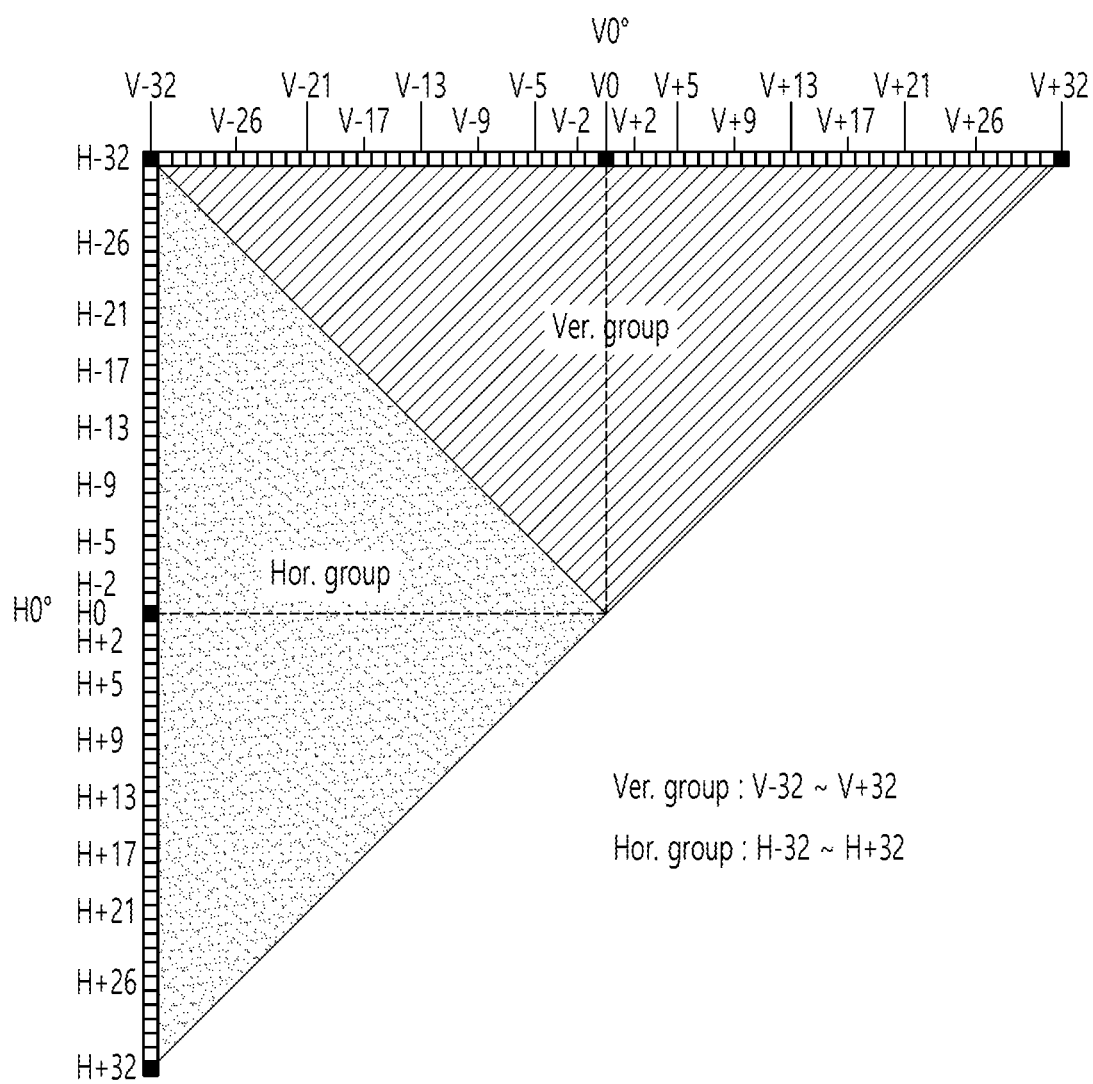
FIG. 6 illustrates the state in which groups have been classified based on intra prediction angles.

FIG. 6 illustrates the state in which groups have been classified based on intra prediction angles.

Referring to FIG. 6, the angles of modes including prediction directions between H+1~H+32 are expressed as angles having a positive sign based on horizontality, and the angles of modes including prediction directions between H−1~H−32 are expressed as angles having a negative sign based on horizontality. That is, the angles of the prediction directions between H+1 H+32 based on a horizontality reference angle 0° corresponding to the No. 10 intra prediction mode are expressed as horizontality reference angles having a positive sign, and the angles of the prediction directions between H−1~H−32 based on the horizontality reference angle 0° are expressed as horizontality reference angles having a negative sign. Furthermore, the angles of modes including prediction directions between V−1~V−32 may be expressed as angles having a negative sign based on verticality, and the angles of modes including prediction directions between V+1~V+32 may be expressed as angles having a positive sign based on verticality. That is, the angles of the prediction directions between V−1~V−32 based on a verticality reference angle 0° corresponding to the No. 26 intra prediction mode may be expressed as verticality reference angles having a negative sign, and the angles of the prediction directions between V+1~V+32 based on the verticality reference angle 0° may be expressed as verticality reference angles having a positive sign. If the prediction angle of an intra prediction mode is included in H−31 to H+32, the corresponding intra prediction mode may be set as a horizontal group. If the prediction angle of an intra prediction mode is included in V−32 to V+32, the corresponding intra prediction mode may be set as a vertical group. That is, the prediction angle of an intra prediction mode may be divided into a horizontal group and a vertical group based on the prediction angles of intra directional modes applied in a PU. If an intra directional mode applied to a PU of an N×N size is included in the horizontal group, TUs of a w×N($1 \leq w < N$) size may be derived using the vertical split method within the region of a PU. Alternatively, if an intra directional mode applied to a PU is included in the vertical group, TUs of a N×h($1 \leq h < N$) size may be derived using the horizontal split method within the region of a PU.

Figure 7:
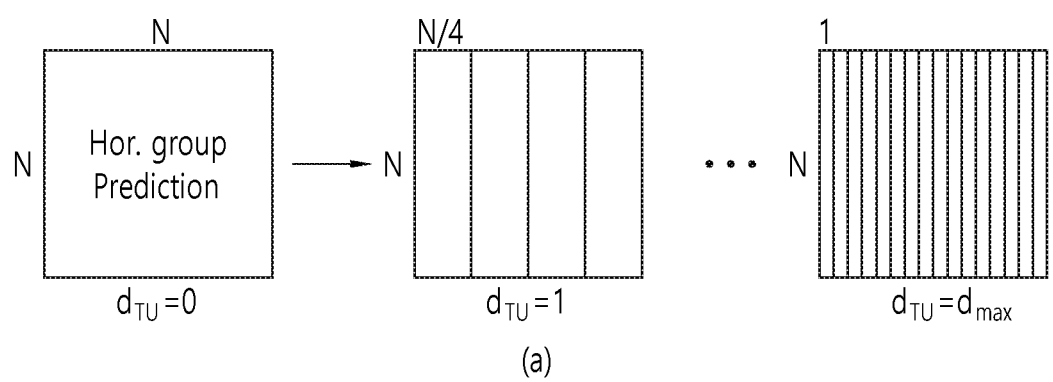
FIG. 7 illustrates a TU split method of groups classified based on prediction angles.
Figure 7:
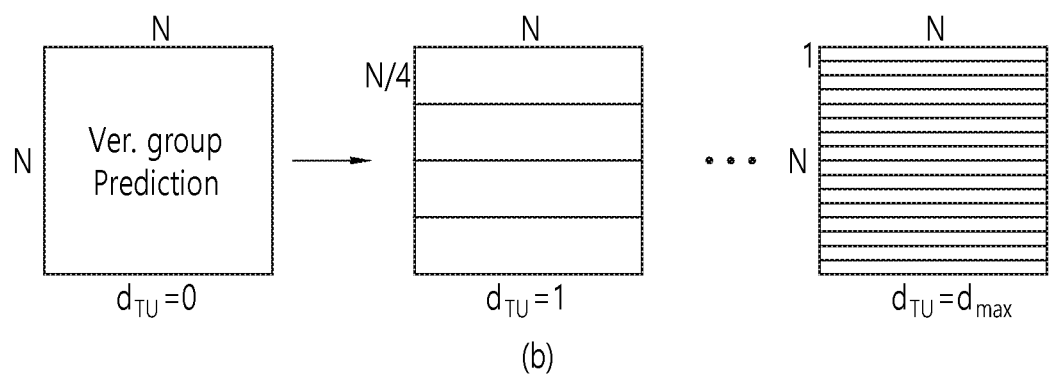

FIG. 7 illustrates a TU split method of groups classified based on prediction angles.

Referring to FIG. 7, FIG. 7(a) shows an example of the split of a TU based on a PU to which an intra directional mode corresponding to the horizontal group has been applied. FIG. 7(b) shows an example of the split of a TU based on a PU to which an intra directional mode corresponding to the vertical group has been applied. If dmu (TU depth) shown in FIG. 7 is 1, a TU may be split in an (N/4)×N or N×(N/4) size. If dmu (TU depth) has a maximum value, a TU may be split in a 1×N or N×1 size. The split TU may be modified in a prediction direction for each sample.

For example, if an intra directional mode applied to a PU corresponds to the horizontal group and a TU split using the vertical split method is a current block, the decoding apparatus may modify a prediction direction for each sample as follows. In this case, the current block may be a block of a w×N($1 \leq w < N$) size.

A PU including the current block is split using the vertical split method, and thus TUs are located from left to right and decoded from left to right according to scan order and thus a TU neighboring the left of the current block may have already been decoded. Accordingly, the reconstruction values of samples included in the TU neighboring the left of the current block may be used for the prediction of a target sample included in the current block. The decoding apparatus may derive one of the samples included in the TU neighboring the left as a reference sample according to an intra directional mode applied to the current block. For example, the reference sample may be derived based on the following equation.

$$P_{ref}(x, y) = \begin{cases} P_{rec}(x-1, y-1), & -31 \leq n \leq -11(A) \\ P_{rec}(x-1, y), & -10 \leq n \leq 11(B) \\ P_{rec}(x-1, y+1), & 12 \leq n \leq 32(C) \end{cases} \quad [\text{Equation 1}]$$

In this case, (x,y) indicates the sample position of the target sample, Pref(x,y) indicates the derived reference sample, Prec(x−1,y−1) indicates the reconstruction value of a top-left neighbor sample of the target sample, Prec(x−1,y) indicates the reconstruction value of a left neighbor sample of the target sample, Prec(x−1,y+1) indicates the reconstruction value of a bottom-left neighbor sample of the target sample, n indicates the horizontal angle H+n (−31≤n≤32) of the intra directional mode, and A, B, and C indicate respective horizontal angle categories.

Figure 8:
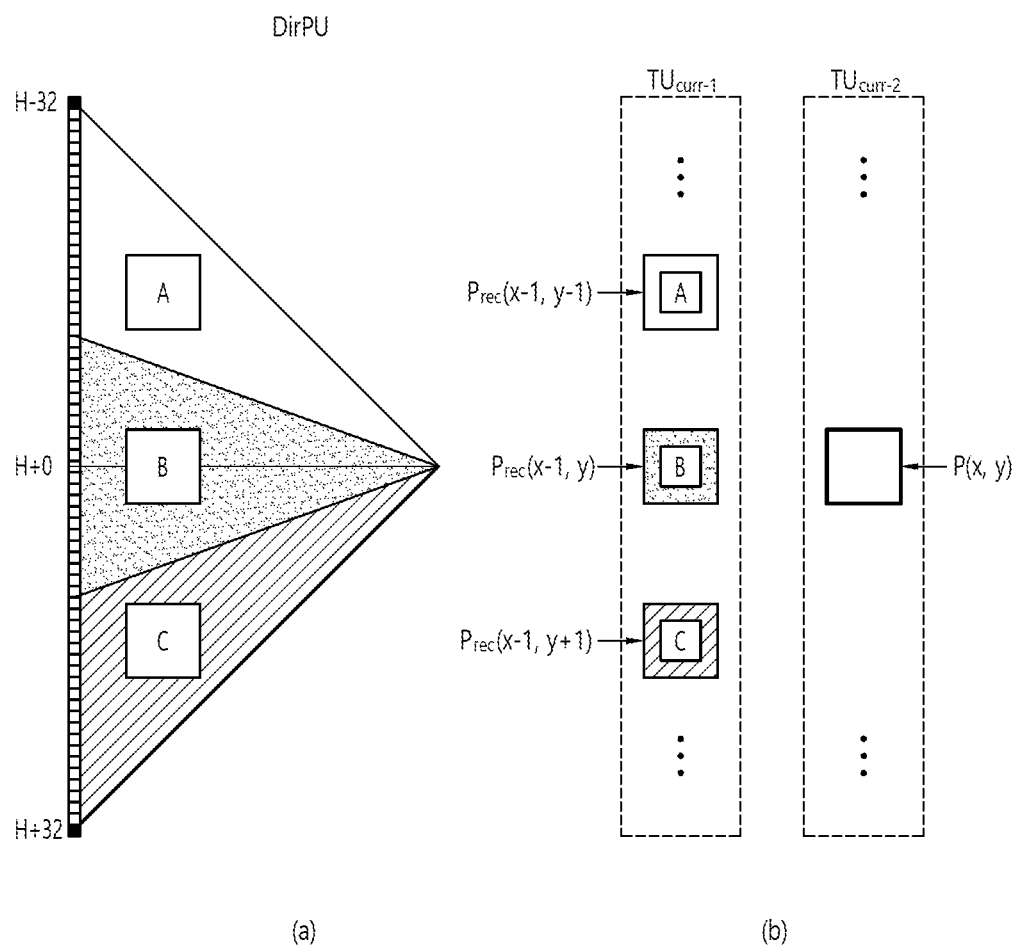
FIG. 8 shows an example in which a reference sample for a target sample is derived.

FIG. 8 shows an example in which a reference sample for a target sample is derived.

FIG. 8 shows samples derived as reference samples according to a horizontal angle category. If an intra prediction angle applied to a PU is included in the horizontal angles H−31 to H−11, the decoding apparatus may derive Prec(x−1,y−1) as a reference sample. If the intra prediction angle applied to the PU is included in the horizontal angles H−10 to H+11, the decoding apparatus may derive Prec(x−1,y) as a reference sample. If the intra prediction angle applied to the PU is included in the horizontal angles H+12 to H+32, the decoding apparatus may derive Prec(x−1,y+1) as a reference sample.

The reference sample of a target sample (this may be hereinafter referred to as a "refine reference sample") is derived through the aforementioned contents. The decoding apparatus may derive the neighbor reference samples of a neighbor block to which the refine reference sample belongs, and may modify the intra prediction direction based on the refine reference sample and the neighbor reference samples of the neighbor block. If the intra prediction direction used in the refine reference sample is a horizontal angle H+m (−31≤m≤32), n samples within the neighbor block corresponding to the prediction direction of a specific range (±r) based on H+m are derived as the neighbor reference samples of the neighbor block. The decoding apparatus derives a prediction direction indicative of a neighbor reference sample having the smallest difference with the refine reference sample as a modified intra prediction direction by comparing the n neighbor reference samples with the refine reference sample. A method of deriving the modified intra prediction direction may be expressed into the following equation, for example.

$$DirRefine(P_{ref}(x, y)) = \quad [\text{Equation 2}]$$
$$\underset{m-r \leq a \leq m+r}{\arg\min} \left\{ \left| PRED_{P_{ref}(x,y)}(a) - P_{ref}(x, y) \right| \right\}$$

In this case, DirRefine(Pref(x,y)) indicates the modified prediction direction, PREDPref(x,y)(a) indicates one of the n neighbor reference samples, Pref(x,y) indicates the refine reference sample, m indicates the prediction direction of an intra directional mode applied to the refine reference sample, and r indicates a positive integer. In this case, the n may be 2r−1.

Meanwhile, for another example, if an intra directional mode applied to a PU corresponds to the vertical group and a TU split using the horizontal split method is a current block, the decoding apparatus may modify a prediction direction for each sample as follows. In this case, the current block may be a block of an N×h(1≤h<N) size.

A PU included in the current block may be split using the horizontal split method. TUs may be located from top to bottom and decoded from top to bottom according to scan order, and thus a TU neighboring the top of the current block may have already been decoded. Accordingly, the reconstruction values of samples included in the TU neighboring the top of the current block may be used for the prediction of a target sample included in the current block. The decoding apparatus may derive one of the samples included in the TU neighboring the top as a reference sample based on an intra directional mode applied to the current block. For example, the reference sample may be derived based on the following equation.

$$P_{ref}(x, y) = \begin{cases} P_{rec}(x-1, y-1), & -32 \leq n \leq -11(D) \\ P_{rec}(x, y-1), & -10 \leq n \leq 11(E) \\ P_{rec}(x+1, y-1), & 12 \leq n \leq 32(F) \end{cases} \quad [\text{Equation 3}]$$

In this case, (x,y) indicates the sample position of the target sample, Pref(x,y) indicates the derived reference sample, Prec(x−1,y−1) indicates the reconstruction value of the top-left neighbor sample of the target sample, Prec(x,y−1) indicates the reconstruction value of the top neighbor sample of the target sample, Prec(x+1,y−1) indicates the reconstruction value of the top-right neighbor sample of the target sample, n indicates the vertical angle V+n (−31≤n≤32) of the intra directional mode, and D, E, and F indicate respective vertical angle categories.

Figure 9:
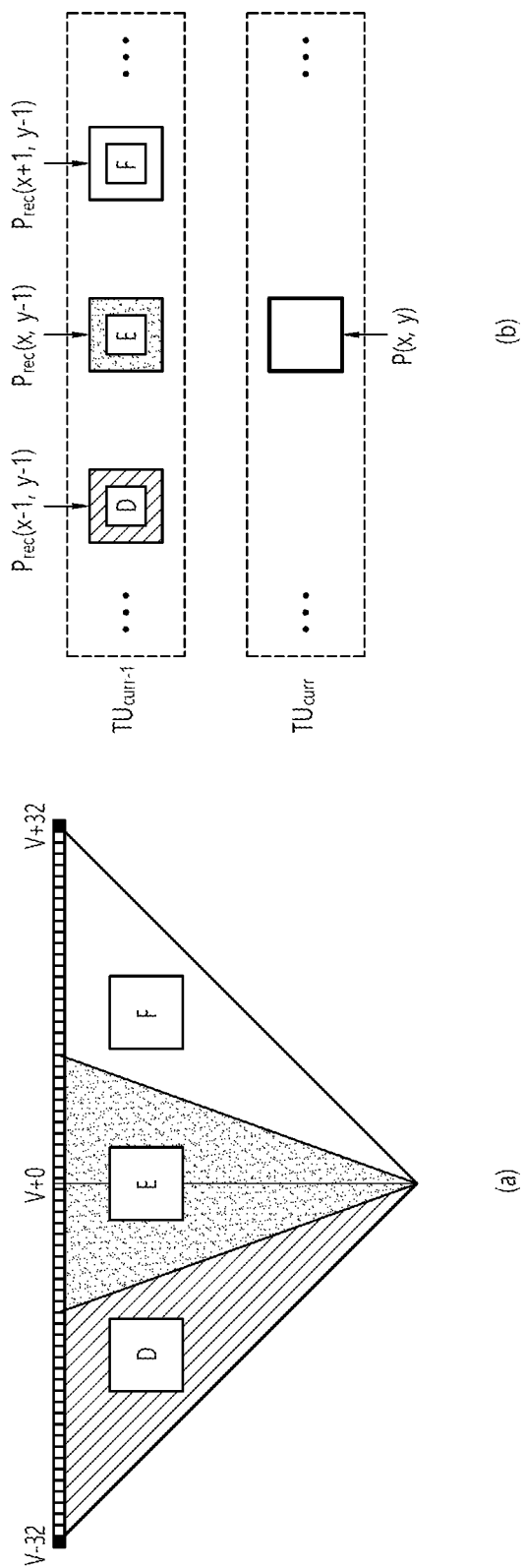
FIG. 9 shows an example in which a reference sample for a target sample is derived.

FIG. 9 shows an example in which a reference sample for a target sample is derived.

FIG. 9 shows samples derived as reference samples according to vertical angle categories. If an intra prediction angle applied to a PU is included in the vertical angles V−32 to V−11, the decoding apparatus may derive Prec(x−1,y−1) as a reference sample. If the intra prediction angle applied to the PU is included in the vertical angles V−10 to V+11, the decoding apparatus may derive Prec(x,y−1) as a reference sample. If the intra prediction angle applied to the PU is included in the vertical angles V+12 to V+32, the decoding apparatus may derive Prec(x+1,y−1) as a reference sample.

A reference sample of a target sample (it may be hereinafter referred to as a "refine reference sample") is derived through the aforementioned contents. The decoding apparatus may derive neighbor reference samples of a neighbor block to which the refine reference sample belongs, and may modify an intra prediction direction based on the refine reference sample and the neighbor reference samples of the neighbor block. If an intra prediction direction used in the refine reference sample is the vertical angle V+m (−31≤m≤32), n samples within the neighbor block corresponding to the prediction direction of a specific range (±r) based on V+m are derived as the neighbor reference samples of the neighbor block. The decoding apparatus derives a prediction direction indicative of a neighbor reference sample having the smallest difference with the refine reference sample as the modified intra prediction direction by comparing the n neighbor reference samples with the refine reference sample. A method of deriving the modified intra prediction direction may be expressed into the following equation, for example.

$$DirRefine(P_{ref}(x, y)) = \operatorname*{argmin}_{m-r \leq a \leq m+r} \left\{ \left| PRED_{P_{ref}(x,y)}(a) - P_{ref}(x, y) \right| \right\}$$ [Equation 4]

In this case, DirRefine(Pref(x,y)) indicates the modified prediction direction, PREDPref(x,y)(a) indicates one of the n neighbor reference samples, Pref(x,y) indicates the refine reference sample, m indicates the prediction direction of the intra directional mode applied to the refine reference sample, and r indicates a positive integer. In this case, the n may be 2r-1.

When a current block is a block having a size of an N×h or w×N (1<h≤N, 1<w≤N), a modified prediction direction may be derived for each sample as in the aforementioned contents. Alternatively, if an intra prediction mode applied to a PU belongs to the horizontal group, the vertical split method is applied to the intra prediction mode, and thus a current block is a block having a size of w×N (1<w≤N) size, modified prediction direction of samples located in the most left column may be derived using the aforementioned method and the modified prediction direction of samples other than the samples may be derived in the same direction as the modified prediction direction of the most left column samples located in the same row. Likewise, if an intra prediction mode applied to a PU belongs to the vertical group, the horizontal split method is applied to the intra prediction mode, and thus a current block is a block having a size of N×h (1<h≤N), the modified prediction direction of samples located in the uppermost row may be derived using the aforementioned method, and the modified prediction direction of samples other than the samples may be derived in the same direction as the modified prediction direction of the uppermost row samples located in the same column.

Figure 10:
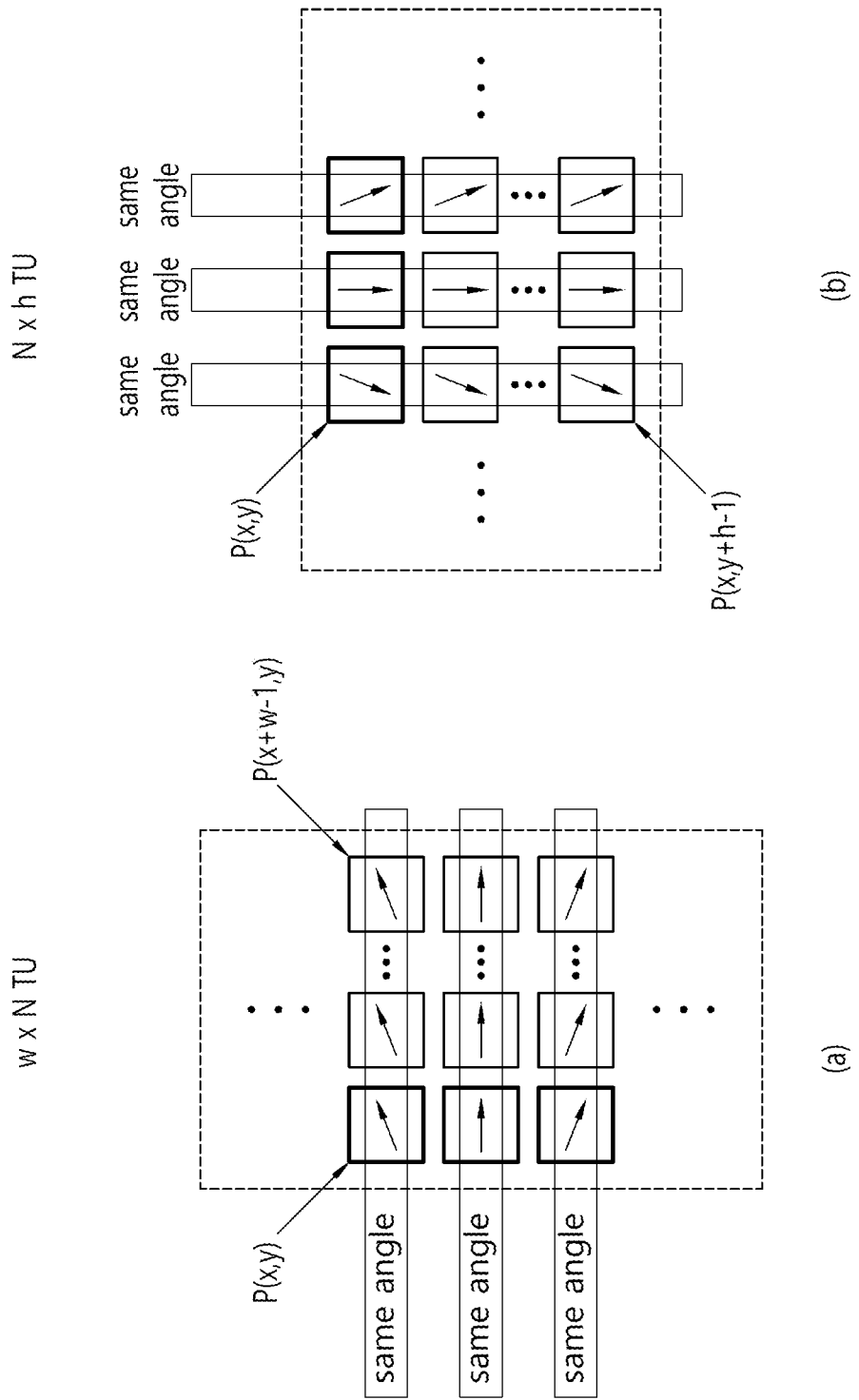
FIG. 10 illustrates the state in which a modified prediction direction is derived when a current block is a block having a size of N×h or w×N ($1<h\leq N$, $1<w\leq N$).

FIG. 10 illustrates the state in which a modified prediction direction is derived when a current block is a block having a size of N×h or w×N (1<h≤N, 1<w≤N).

FIG. 10 shows an intra prediction direction for each sample in a block of a w×N size and an intra prediction direction for each sample in a block of an N×h size. In FIG. 10(a), P(x,y) is a sample having an (x,y) sample position, and indicates one of samples located in the most left column of the block. The modified intra prediction direction of P(x,y) may be derived based on the refine reference sample of the P(x,y) as described above. In this case, for example, modified intra prediction direction may be derived based on Equation 2. Samples P(x+1,y) to P(x+w−1,y) located in the same row as P(x,y) other than the most left column may be derived in the intra prediction direction, that is, the same direction as the modified intra prediction direction of the P(x,y). Likewise, in FIG. 10(b), P(x,y) is a sample having an (x,y) sample position, and indicates one of samples located in the uppermost row of the block. The modified intra prediction direction of the P(x,y) may be derived based on the refine reference sample of the P(x,y) as described above. In this case, for example, the modified intra prediction direction may be derived based on Equation 4. Samples P(x, y+1) to P(x, y+h−1) located in the same column as the P(x,y) other than the uppermost row may be derived in the intra prediction direction, that is, the same direction as the modified intra prediction direction of the P(x,y).

Meanwhile, the encoding apparatus may transmit an angle refine flag "angle_refine_flag" to the decoding apparatus. The angle refine flag may indicate whether the aforementioned modified prediction direction according to the present invention is used. That is, the encoding apparatus may provide notification whether the modified intra prediction direction is used through the angle refine flag. For example, when the value of the angle refine flag is 1, the encoding apparatus and the decoding apparatus may predict a target sample within a current block based on the modified prediction direction. For example, the angle refine flag may be transmitted when the index of the intra prediction mode of a current PU is greater than 1. For example the angle refine flag may be transmitted through syntax, such as Table 2. The syntax may be a CU syntax, for example, and may be included in a bit stream and transmitted.

TABLE 2

| coding unit( x0, y0, log2CbSize ) { | Descriptor |
|---|---|
| if( transquant bypass enabled flag ) | |
|   cu transquant bypass flag | ae(v) |
| if( slice type != I ) | |
|   cu skip flag[ x0 ][ y0 ] | ae(v) |
| nCbS = ( 1 << log2CbSize ) | |
| if( cu skip flag[ x0 ][ y0 ] ) | |
|   prediction unit( x0, y0, nCbS, nCbS ) | |
| else { | |
|   if (slice type != I ) | |
|     pred mode flag | ae(v) |
|   if( CuPredMode[ x0 ][ y0 ] != MODE_INTRA \|\| log2CbSize - - MinCbLog 2SizeY ) | |
|     part mode | ae(v) |
|   if( CuPredMode[ x0 \|\| y0 ] = = MODE INTRA ) { | |
|     if( PartMode = = PART 2N×2N && pcm enabled flag && | |
|       log2CbSize >= Log2MinIpcmCbSizeY && | |
|       log2CbSize <= Log2MaxIpcmCbSizeY ) | |
|       pcm flag [ x0 ][ y0 ] | ae(v) |
|     if( pcm flag[ x0 ][ y0 ] ) { | |
|       while( !byte aligned( ) ) | |
|         pcm alignment zero bit | f(l) |
|       pcm sample( x0, y0, log2CbSize ) | |
|     } else { | |
|       pbOffset = ( PartMode = = PART N×N ) ? ( nCbS / 2 ) : nCbS | |
|       for ( j = 0; j < nCbS; j = j + pbOffset ) | |
|         for(i = 0; i < nCbS; i = i + pbOffset ) | |
|           prev intra luma pred flag[ x0 + i ][ y0 + j ] | ae(v) |
|       for( j = 0; j < nCbS; j = j + pbOffset ) | |
|         for( i = 0; i < nCbS; i = i + pbOffset ) | |
|           if( prev intra luma pred flag[ x0 + i ][ y0 + j ] ) | |
|             mpm idx[ x0 + i ][ y0 + j ] | ae(v) |
|           else | |
|             rem intra luma pred mode[ x0 + i ][ y0 + j ] | ae(v) |
|       for( j = 0; j < nCbS; j = j + pbOffset ) | |
|         for ( i = 0; i < nCbS; i = i + pbOffset ) | |
|           if( IntraPredModeY[ x0 + i ][ y0 + j ] >1 ) | |
|             angle refine flag[ x0 + i ][ y0 + j ] | ae(v) |
|     } else { | |
|       ... | |
|     } | |
|   ... | |
|   } | |
| } | |

Referring to Table 2, the angle_refine_flag syntax element corresponds to the angle refine flag. The IntraPredModeY information indicates the index of the intra prediction mode of the current PU. The angle_refine_flag syntax element may be transmit/received and parsed when the value of the IntraPredModeY information is greater than 1.

Figure 11:
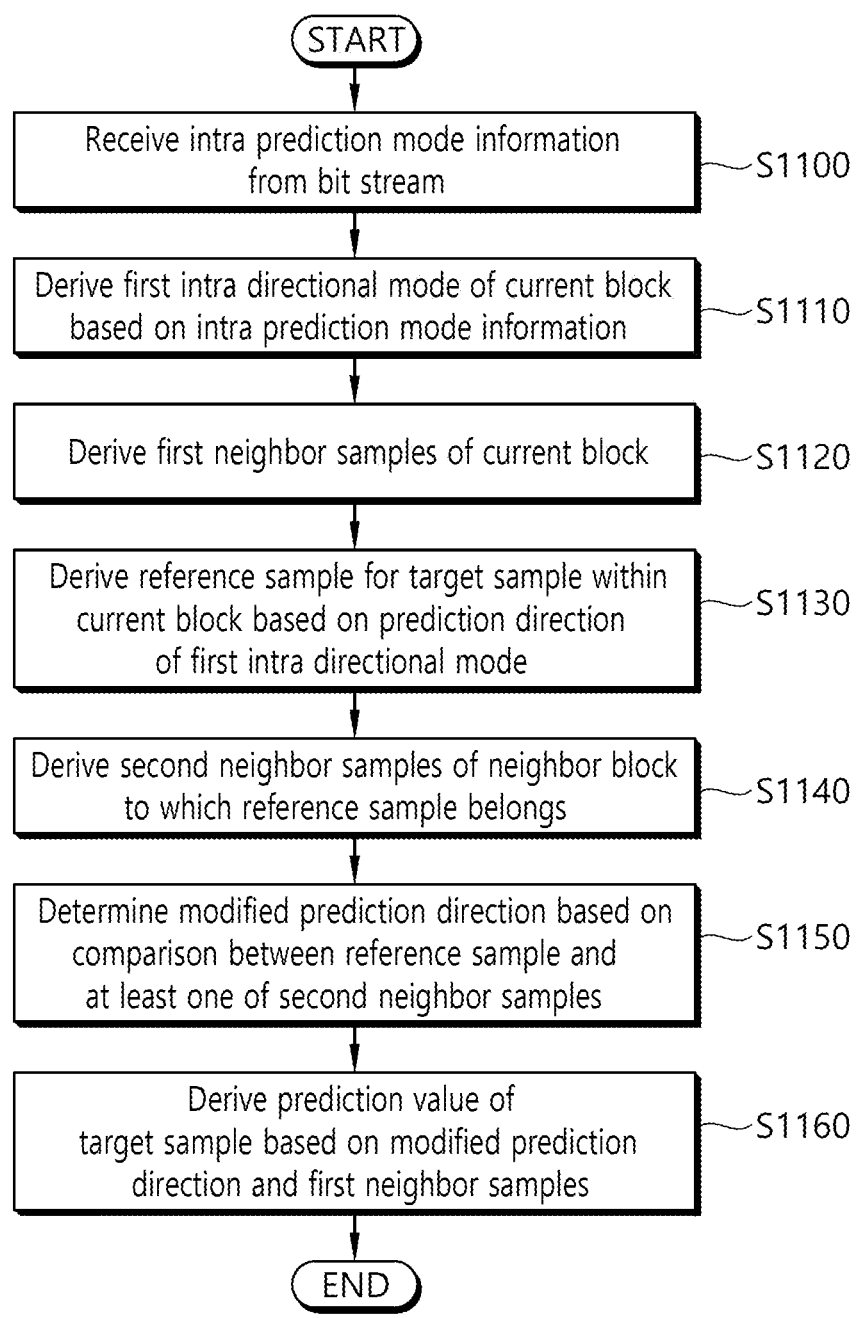
FIG. 11 schematically shows an intra prediction method of a decoding apparatus according to the present invention.

FIG. 11 schematically shows an intra prediction method of the decoding apparatus according to the present invention. The method disclosed in FIG. 11 may be performed by the decoding apparatus disclosed in FIG. 2. Specifically, for example, in FIG. 8, S1100 may be performed by the entropy decoding unit of the decoding apparatus, and S1110 to S1160 may be performed by the prediction unit of the decoding apparatus.

Referring to FIG. 11, the decoding apparatus obtains information about an intra prediction mode from a bit stream (S1100). The decoding apparatus may decode a bit stream received from the encoding apparatus and obtain information about an intra prediction mode.

The information about the intra prediction mode may include index information indicative of the intra prediction mode of a current PU. Furthermore, the bit stream may include an angle refine flag. The angle refine flag may be transmitted when index information indicative of the intra prediction mode of the current PU is greater than 1. Furthermore, the bit stream may include a vertical split flag or a horizontal split flag. If the value of the vertical split flag or the horizontal split flag is 1, the current PU may be split into TUs through a vertical split method or a horizontal split method. The bit stream may be received over a network or through a storage medium.

The decoding apparatus derives the intra prediction mode of a current block as a first intra direction mode based on the intra prediction mode information (S1110). The decoding apparatus may determine the intra prediction mode depending on whether the most probable mode (MPM) or the remaining mode is applied, and may derive the intra prediction mode as the first intra direction mode. If the MPM mode is applied, the decoding apparatus may determine an MPM list based on the intra prediction mode of the left or top neighbor block of the current block, may determine the intra prediction mode based on the MPM list and the index information, and may derive the intra prediction mode as the first intra direction mode. Alternatively, if the remaining mode is applied, the decoding apparatus may determine an intra prediction mode based on the index information from among the remaining prediction modes not included in the MPM list, and may derive the intra prediction mode as the first intra direction mode.

The decoding apparatus derives the first neighbor samples of the current block (S1120). The first neighbor samples may include the left neighbor samples, top-left neighbor sample, and top neighbor samples of the current block.

For example, assuming that the top-left sample position of the current block is (0, 0), left neighbor samples p[−1][2H−1], . . . , p[−1][0], a top-left neighbor sample p[−1][−1], and top neighbor samples p[0][−1], . . . , p[2 W−1][−1] may be derived as neighbor reference samples for the intra prediction of the current block. In this case, p[m][n] may indicate a sample (or pixel) at a sample position (m,n). In this case, W and H may correspond to the width and height of the current block, respectively.

The decoding apparatus derives a (refine) reference sample neighboring a target sample within the current block based on the prediction direction of the first intra direction mode (S1130). As in FIG. 6, the angles of modes including prediction directions between H+1~H+32 are expressed as angles having a positive sign based on horizontality, and the angles of modes including prediction directions between H−1~H−32 are expressed as angles having a negative sign based on horizontality. That is, the angles of the prediction directions between H+1~H+32 based on a horizontality reference angle 0° corresponding to the No. 10 intra prediction mode are expressed as horizontality reference angles having a positive sign, and the angles of the prediction directions between H−1~H−32 based on the horizontality reference angle 0° are expressed as horizontality reference angles having a negative sign. Furthermore, the angles of modes including prediction directions between V−1~V−32 may be expressed as angles having a negative sign based on verticality, and the angles of modes including prediction directions between V+1~V+32 may be expressed as angles having a positive sign based on verticality. That is, the angles of the prediction directions between V−1~V−32 based on a verticality reference angle 0° corresponding to the No. 26 intra prediction mode may be expressed as verticality reference angles having a negative sign, and the angles of the prediction directions between V+1~V+32 based on the verticality reference angle 0° may be expressed as verticality reference angles having a positive sign. If the prediction angle of an intra prediction mode is included in H−31 to H+32, the corresponding intra prediction mode may be set as a horizontal group. If the prediction angle of an intra prediction mode is included in V−32 to V+32, the corresponding intra prediction mode may be set as a vertical group. The decoding apparatus may determine whether the first intra direction mode is included in the horizontal group or the vertical group based on the prediction direction of the first intra direction mode. If the first intra direction mode is included in the horizontal group, the decoding apparatus may derive the reference sample of the target sample from the left block of the current block using a sample neighboring the left boundary of the current block as the target sample. If the first intra direction mode is included in the vertical group, the decoding apparatus may derive the reference sample of the target sample from the top block of the current block using a sample neighboring the top boundary of the current block as the target sample.

Specifically, if the first intra direction mode is included in the horizontal group, as in FIG. 8, the decoding apparatus may set P(x,y) neighboring the left boundary of the current block as a target sample. If the prediction angle of the first intra direction mode is included in the horizontal angles H−31 to H−11, the decoding apparatus may derive the top-left neighbor sample of the target sample as a reference sample of the target sample. If the prediction angle of the first intra direction mode is included in the horizontal angles H−10 to H+11, the decoding apparatus may derive the left neighbor sample of the target sample as a reference sample of the target sample. If the prediction angle of the first intra direction mode is included in the horizontal angles H+12 to H+32, the decoding apparatus may derive the bottom-left neighbor sample of the target sample as a reference sample of the target sample. In this case, the decoding apparatus may derive the reference sample based on Equation 1.

Furthermore, if the first intra direction mode is included in the vertical group, as in FIG. 9, the decoding apparatus may set P(x,y) neighboring the top boundary of the current block as a target sample. If the prediction angle of the first intra direction mode is included in the vertical angles V−32 to V−11, the decoding apparatus may derive the top-left neighbor sample of the target sample as a reference sample. If the prediction angle of the first intra direction mode is included in the vertical angles V−10 to V+11, the decoding apparatus may derive the top neighbor sample of the target sample as a reference sample. If the prediction angle of the first intra direction mode is included in the vertical angles V+12 to V+32, the decoding apparatus may derive the top-right neighbor sample of the target sample as a reference sample. In this case, the decoding apparatus may derive the reference sample based on Equation 3.

Furthermore, the decoding apparatus may derive a target sample corresponding to the index of the first intra direction mode and the reference sample of the target sample based on the index.

Specifically, if the first intra direction mode is one of the Nos. 2 to 17 intra prediction modes, the decoding apparatus may set P(x,y) neighboring the left boundary of the current block as a target sample. When the sample position of the target sample is (x,y) and the first intra direction mode is one of the Nos. 2 to 6 intra prediction modes, the sample position of the reference sample may be (x−1,y+1). When the sample position of the target sample is (x,y) and the first intra direction mode is one of the Nos. 7 to 13 intra prediction modes, the sample position of the reference sample may be. When the sample position of the target sample is (x,y) and the first intra direction mode is one of the Nos. 14 to 17 intra prediction modes, the sample position of the reference sample may be (x−1,y−1).

If the first intra direction mode is one of the Nos. 18 to 34 intra prediction modes, the decoding apparatus may set P(x,y) neighboring the top boundary of the current block as a target sample. When the sample position of the target sample is (x,y) and the first intra direction mode is one of the Nos. 18 to 22 intra prediction modes, the sample position of the reference sample may be (x−1,y−1). When the sample position of the target sample is (x,y) and the first intra direction mode is one of the Nos. 23 to 29 intra prediction modes, the sample position of the reference sample may be (x,y−1). When the sample position of the target sample is (x,y) and the first intra direction mode is one of the Nos. 30 to 34 intra prediction modes, the sample position of the reference sample may be (x+1,y−1).

The decoding apparatus derives second neighbor samples of a neighbor block to which the reference sample belongs (S1140). The second neighbor samples may include the left neighbor samples, top-left neighbor sample, and top neighbor samples of the neighbor block to which the reference sample belongs.

For example, assuming that the top-left sample position of the neighbor block is (x0, y0), left neighbor samples p[x0−1][y0+2Href−1], . . . , p[x0−1][y0], a top-left neighbor sample p[x0−1][y0−1], and top neighbor samples p[x0][y0−1], . . . , p[x0+2Wref−1][y0−1] may be derived as neighbor samples for the intra prediction of the current block. In this case, p[m][n] may indicate a sample (or pixel) at a sample position (m,n). In this case, Wref and Href may correspond to the width and height of the neighbor block, respectively.

The decoding apparatus determines a modified prediction direction based on a comparison between the reference sample and the at least one of the second neighbor samples (S1150).

Assuming that the intra directional mode of a neighbor block including the reference sample is a second intra direction mode, the decoding apparatus may derive a neighbor sample 1 located in the prediction direction of the second intra direction mode based on the reference sample. In this case, the neighbor sample 1 is included in the second neighbor samples. The decoding apparatus may derive the n neighbor samples based on the neighbor sample 1 of the second neighbor samples. In this case, the n neighbor samples may include the neighbor sample 1, and may include a plurality of neighbor samples located within a specific distance from the neighbor sample 1.

Specifically, if the prediction direction of the second intra direction mode is the horizontal angle H+m (−31≤m≤32), the decoding apparatus may derive the n neighbor samples corresponding to the prediction direction of a specific range (±r) based on the H+m.

Furthermore, if the prediction direction of the second intra direction mode is the vertical angle V+m (−31≤m≤32), the decoding apparatus may derive the n neighbor samples corresponding to the prediction direction of a specific range (±r) based on the V+m.

In this case, the decoding apparatus may derive a prediction direction indicative of a neighbor sample having the smallest difference with the reference sample as a modified intra prediction direction by comparing the n neighbor samples with the reference sample. In this case, the decoding apparatus may derive the modified intra prediction direction based on Equation 2 or Equation 4.

The decoding apparatus derives a prediction value of the target sample based on the modified prediction direction and the first neighbor samples (S1160). The decoding apparatus may derive the prediction value of the target sample based on a first neighbor sample located in the modified prediction direction (i.e., a neighbor sample located in the modified prediction direction from the target sample position). For example, when the value of the angle refine flag is 1, the decoding apparatus may derive the prediction value of the target sample based on a modified intra prediction direction for the target sample of the current block.

The decoding apparatus may generate a reconstruction sample based on the prediction value of the target sample. The decoding apparatus may receive a residual signal from the encoding apparatus and generate a residual sample for the current block. In this case, the decoding apparatus may generate the reconstruction sample based on the prediction value and the residual sample.

Thereafter, in order to improve subjective/objective picture quality if necessary, the decoding apparatus may apply an in-loop filtering procedure, such as a deblocking filtering and/or SAO procedure, to the reconstruction picture as described above.

FIG. 12 schematically shows an intra prediction method of the encoding apparatus according to the present invention. The method disclosed in FIG. 12 may be performed by the encoding apparatus disclosed in FIG. 1. Specifically, for example, in FIG. 12, S1200 to S1240 may be performed by the prediction unit of the encoding apparatus, and S1250 may be performed by the entropy encoding unit of the encoding apparatus.

The encoding apparatus derives the first intra direction mode and first neighbor samples of a current block (S1200). The encoding apparatus may determine an optimal intra prediction mode for a current PU based on the RD cost, and may derive the intra prediction mode as the first intra direction mode of the current block. In this case, the encoding apparatus may determine whether the most probable mode (MPM) or the remaining mode is applied in order to signal intra prediction mode information indicative of the determined first intra direction mode, may include corresponding information in the intra prediction mode information, and may signal the intra prediction mode information. The first neighbor samples may include the left neighbor samples, top-left neighbor sample, and top neighbor samples of the current block.

For example, assuming that the top-left sample position of the current block is (0, 0), left neighbor samples p[−1][2H−1], . . . , p[−1][0], a top-left neighbor sample p[−1][−1], and top neighbor samples p[0][−1], . . . , p[2 W−1][−1] may be derived as the neighbor reference samples for the intra prediction of the current block. In this case, p[m][n] may indicate a sample (or pixel) at a sample position (m,n). In this case, W and H may correspond to the width and height of the current block, respectively.

The encoding apparatus determines a (refine) reference sample neighboring a target sample within the current block based on the prediction direction of the first intra direction mode (S1210). As in FIG. 6, the angles of modes including prediction directions between H+1~H+32 are expressed as angles having a positive sign based on horizontality, and the angles of modes including prediction directions between H−1~H−32 are expressed as angles having a negative sign based on horizontality. That is, the angles of the prediction directions between H+1~H+32 based on a horizontality reference angle 0° corresponding to the No. 10 intra prediction mode are expressed as horizontality reference angles having a positive sign, and the angles of the prediction directions between H−1~H−32 based on the horizontality reference angle 0° are expressed as horizontality reference angles having a negative sign. Furthermore, the angles of modes including prediction directions between V−1~V−32 may be expressed as angles having a negative sign based on verticality, and the angles of modes including prediction directions between V+1~V+32 may be expressed as angles having a positive sign based on verticality. That is, the angles of the prediction directions between V−1~V−32 based on a verticality reference angle 0° corresponding to the No. 26 intra prediction mode may be expressed as verticality reference angles having a negative sign, and the angles of the prediction directions between V+1~V+32 based on the verticality reference angle 0° may be expressed as verticality reference angles having a positive sign. If the prediction angle of an intra prediction mode is included in H−31 to H+32, the corresponding intra prediction mode may be set as a horizontal group. If the prediction angle of an intra prediction mode is included in V−32 to V+32, the corresponding intra prediction mode may be set as a vertical group. The encoding apparatus may determine whether the first intra direction mode is included in the horizontal group or the vertical group based on the prediction direction of the first intra direction mode. If the first intra direction mode is included in the horizontal group, the encoding apparatus may derive the reference sample of the target sample from the left block of the current block using a sample neighboring the left boundary of the current block as the target sample. If the first intra direction mode is included in the vertical group, the encoding apparatus may derive the reference sample of the target sample from the top block of the current block using a sample neighboring the top boundary of the current block as the target sample.

Specifically, if the first intra direction mode is included in the horizontal group, as in FIG. 8, the encoding apparatus may set P(x,y) neighboring the left boundary of the current block as a target sample. If the prediction angle of the first intra direction mode is included in the horizontal angles H−31 to H−11, the encoding apparatus may derive the top-left neighbor sample of the target sample as a reference sample of the target sample. If the prediction angle of the first intra direction mode is included in the horizontal angles H−10 to H+11, the encoding apparatus may derive the left neighbor sample of the target sample as a reference sample of the target sample. If the prediction angle of the first intra direction mode is included in the horizontal angles H+12 to H+32, the encoding apparatus may derive the bottom-left neighbor sample of the target sample as a reference sample of the target sample. In this case, the encoding apparatus may derive the reference sample based on Equation 1.

Furthermore, if the first intra direction mode is included in the vertical group, as in FIG. 9, the encoding apparatus may set P(x,y) neighboring the top boundary of the current block as a target sample. If the prediction angle of the first intra direction mode is included in the vertical angles V−32 to V−11, the encoding apparatus may derive the top-left neighbor sample of the target sample as a reference sample. If the prediction angle of the first intra direction mode is included in the vertical angles V−10 to V+11, the encoding apparatus may derive the top neighbor sample of the target sample as a reference sample. If the prediction angle of the first intra direction mode is included in the vertical angles V+12 to V+32, the encoding apparatus may derive the top-right neighbor sample of the target sample as a reference sample. In this case, the encoding apparatus may derive the reference sample based on Equation 3.

Furthermore, the encoding apparatus may derive a target sample corresponding to the index of the first intra direction mode and the reference sample of the target sample based on the index.

Specifically, if the first intra direction mode is one of the Nos. 2 to 17 intra prediction modes, the encoding apparatus may set P(x,y) neighboring the left boundary of the current block as a target sample. When the sample position of the target sample is (x,y) and the first intra direction mode is one of the Nos. 2 to 6 intra prediction modes, the sample position of the reference sample may be (x−1,y+1). When the sample position of the target sample is (x,y) and the first intra direction mode is one of the Nos. 7 to 13 intra prediction modes, the sample position of the reference sample may be (x−1,y). When the sample position of the target sample is (x,y) and the first intra direction mode is one of the Nos. 14 to 17 intra prediction modes, the sample position of the reference sample may be (x−1,y−1).

If the first intra direction mode is one of the Nos. 18 to 34 intra prediction modes, the encoding apparatus may set P(x,y) neighboring the top boundary of the current block as a target sample. When the sample position of the target sample is (x,y) and the first intra direction mode is one of the Nos. 18 to 22 intra prediction modes, the sample position of the reference sample may be (x−1,y−1). When the sample position of the target sample is (x,y) and the first intra direction mode is one of the Nos. 23 to 29 intra prediction modes, the sample position of the reference sample may be (x,y−1). When the sample position of the target sample is (x,y) and the first intra direction mode is one of the Nos. 30 to 34 intra prediction modes, the sample position of the reference sample may be (x+1,y−1).

The encoding apparatus derives the second neighbor samples of a neighbor block to which the reference sample belongs (S1220). The second neighbor samples may include the left neighbor samples, top-left neighbor sample, and top neighbor samples of the neighbor block to which the reference sample belongs.

For example, assuming that the top-left sample position of the neighbor block is (x0, y0), left neighbor samples p[x0−1][y0+2Href−1], . . . , p[x0−1] [y0], a top-left neighbor sample p[x0−1] [y0−1], and top neighbor samples p[x0][y0−1], . . . , p[x0+2Wref−1][y0−1] may be derived as neighbor samples for the intra prediction of the current block. In this case, p[m][n] may indicate a sample (or pixel) at a sample position (m,n). In this case, Wref and Href may correspond to the width and height of the neighbor block, respectively.

The encoding apparatus determines a modified prediction direction based on a comparison between the reference sample and the at least one of the second neighbor samples (S1230).

Assuming that the intra directional mode of a neighbor block including the reference sample is a second intra direction mode, the encoding apparatus may derive a neighbor sample 1 located in the prediction direction of the second intra direction mode based on the reference sample. In this case, the neighbor sample 1 is included in the second neighbor samples. The encoding apparatus may derive the n neighbor samples based on the neighbor sample 1 of the second neighbor samples. In this case, the n neighbor samples may include the neighbor sample 1, and may include a plurality of neighbor samples located within a specific distance from the neighbor sample 1.

Specifically, if the prediction direction of the second intra direction mode is the horizontal angle H+m ($-31 \leq m \leq 32$), the encoding apparatus may derive the n neighbor samples corresponding to the prediction direction of a specific range ($\pm r$) based on the H+m.

Furthermore, if the prediction direction of the second intra direction mode is the vertical angle V+m ($-31 \leq m \leq 32$), the encoding apparatus may derive the n neighbor samples corresponding to the prediction direction of a specific range ($\pm r$) based on the V+m.

In this case, the encoding apparatus may derive a prediction direction indicative of a neighbor sample having the smallest difference with the reference sample as a modified intra prediction direction by comparing the n neighbor samples with the reference sample. In this case, the encoding apparatus may derive the modified intra prediction direction based on Equation 2 or Equation 4.

The encoding apparatus derives a prediction value of the target sample based on the modified prediction direction and the first neighbor samples (S1240). The encoding apparatus may derive the prediction value of the target sample based on a first neighbor sample located in the modified prediction direction (i.e., a neighbor sample located in the modified prediction direction from the target sample position). For example, when the value of the angle refine flag is 1, the encoding apparatus may derive the prediction value of the target sample based on a modified intra prediction direction for the target sample of the current block.

The encoding apparatus encodes and outputs intra prediction mode information indicative of the first intra direction mode (S1250). The intra prediction mode information may include index information indicative of the intra prediction mode of the current PU. The intra prediction mode information may be transmitted in the form of a bit stream. The bit stream may be transmitted to the decoding apparatus over a network or through a storage medium.

Furthermore, the bit stream may include an angle refine flag. The angle refine flag may be transmitted when index information indicative of the intra prediction mode of the current PU is greater than 1. Furthermore, the bit stream may include a vertical split flag or a horizontal split flag.

In accordance with the present invention, a plurality of non-square transform units (TU) may be derived, thereby being capable of improving intra prediction performance.

Furthermore, in accordance with the present invention, an intra prediction direction can be adjusted in a simple unit of a current block, thereby being capable of improving intra prediction performance.

In accordance with the present invention, a reference sample of the target sample of a current block can be selected based on an intra prediction mode, thereby being capable of improving intra prediction performance.

In accordance with the present invention, a prediction direction can be adjusted in a simple unit within a current block. Accordingly, the accuracy of prediction can be increased using an optimal intra prediction direction in a simple unit and the amount of data of a residual signal is reduced, thereby being capable of improving overall coding efficiency.

In the aforementioned embodiments, although the methods have been described based on the flowcharts in the form of a series of steps or blocks, the present invention is not limited to the sequence of the steps, and some of the steps may be performed in the sequence different from that of other steps or may be performed simultaneously with other steps. Furthermore, those skilled in the art will understand that the steps shown in the flowchart are not exclusive and the steps may include additional steps or that one or more steps in the flowchart may be deleted without affecting the range of right of the present invention.

The method according to the present invention described above may be implemented in software. The encoding device and/or decoding device according to the present invention may be included in a device that performs image processing, for example, for a TV, a computer, a smart phone, a set-top box, or a display device.

When the embodiments of the present invention are implemented in software, the above-described method may be implemented by modules (processes, functions, and so on) that perform the functions described above. Such modules may be stored in memory and executed by a processor. The memory may be internal or external to the processor, and the memory may be coupled to the processor using various well known means. The processor may include an application-specific integrated circuit (ASIC), other chipsets, a logic circuit and/or a data processing device. The memory may include read-only memory (ROM), random access memory (RAM), flash memory, memory card, a storage medium and/or other storage devices.

What is claimed is:
1. An intra prediction method performed in an image decoding apparatus, comprising steps of:
receiving intra prediction mode information and split flag information through a bit stream;
deriving, based on the split flag information, a plurality of non-square transform units (TUs) from a current prediction unit (PU), wherein the split flag information represents whether the current PU is vertically or horizontally split into the non-square TUs;
deriving, based on the intra prediction mode information, a first intra direction mode;
generating, based on a first prediction direction of the first intra direction mode, a prediction value of a first target sample in a current TU, among the non-square TUs;
deriving first neighbor samples of the current TU;
deriving a reference sample neighboring a second target sample within the current block TU based on the first prediction direction of the first intra direction mode;
deriving second neighbor samples of a neighbor block to which the reference sample belongs;
determining a modified prediction direction based on a comparison between the reference sample and at least one of the second neighbor samples; and
generating a prediction value of the second target sample in the current TU based on the modified prediction direction and the first neighbor samples, wherein the modified prediction direction used for generating the prediction value of the second target sample in the current TU is different from the first prediction direction used for generating the prediction value of the first target sample in the current TU.

2. The intra prediction method of claim 1, further comprising steps of:
deriving a neighbor sample 1 located in a prediction direction of a second intra direction mode of the neighbor block based on the reference sample from the second neighbor samples;
deriving n neighbor samples from the second neighbor samples based on neighbor samples located within a specific distance from the neighbor sample 1,
wherein a direction indicative of a sample belonging to the n neighbor samples and having a smallest difference with the reference sample is determined to be the modified prediction direction based on a comparison between the n neighbor samples and the reference sample.

3. The intra prediction method of claim 2, wherein the modified prediction direction is determined based on an equation below, $$DirRefine(P_{ref}(x, y)) = \underset{m-r \leq a \leq m+r}{\operatorname{argmin}} \{|PRED_{P_{ref}(x,y)}(a) - P_{ref}(x, y)|\}$$

wherein $DirRefine(P_{ref}(x,y))$ is the modified prediction direction, $PREDP_{ref}(x,y)(a)$ is one of the n neighbor samples, $P_{ref}(x,y)$ is the reference sample, m is the prediction direction of the second intra direction mode, r is a positive integer, and the n is 2r−1.

4. The intra prediction method of claim 1, wherein based on the first intra direction mode being one of Nos. 2 to 17 intra prediction modes, the neighbor block is a left block of the current TU and the second target sample neighbors a left boundary of the current TU.

5. The intra prediction method of claim 4, wherein:
when a sample position of the target sample is (x,y) and the first intra direction mode is one of the Nos. 2 to 6 intra prediction modes, a sample position of the reference sample is (x−1,y+1),
when a sample position of the target sample is (x,y) and the first intra direction mode is one of the Nos. 7 to 13 intra prediction modes, a sample position of the reference sample is P(x−1,y), and
when a sample position of the target sample is (x,y) and the first intra direction mode is one of the Nos. 14 to 17 intra prediction modes, a sample position of the reference sample is (x−1,y−1).

6. The intra prediction method of claim 5, further comprising a step of deriving a prediction value of a sample belongs to samples of the current TU and located on a right side of the target sample based on the modified prediction direction.

7. The intra prediction method of claim 1, wherein based on the first intra direction mode being one of Nos. 18 to 34 intra prediction modes, the neighbor block is a top block of the current TU and the second target sample neighbors a top boundary of the current TU.

8. The intra prediction method of claim 7, wherein:
when a sample position of the target sample is (x,y) and the first intra direction mode is one of the Nos. 18 to 22 intra prediction modes, a sample position of the reference sample is (x−1,y−1),
when a sample position of the target sample is (x,y) and the first intra direction mode is one of the Nos. 23 to 29 intra prediction modes, a sample position of the reference sample is (x,y−1), and
when a sample position of the target sample is (x,y) and the first intra direction mode is one of the Nos. 30 to 34 intra prediction modes, a sample position of the reference sample is (x+1,y−1).

9. The intra prediction method of claim 8, further comprising a step of deriving a prediction value of a sample belonging to samples of the current TU and located at a bottom of the target sample based on the modified prediction direction.

10. The intra prediction method of claim 1, further comprising a step of receiving an angle refine flag through the bit stream,
wherein based on a value of the angle refine flag being 1, the prediction value of the second target sample in the current TU is derived based on the modified prediction direction.

11. The intra prediction method of claim 10, wherein the angle refine flag is received when an intra prediction mode index of the first intra direction mode is greater than 1.

12. An intra prediction method performed in an image encoding apparatus, comprising steps of:
deriving a plurality of non-square transform units (TUs) from a current prediction unit (PU);
generating a split flag information representing whether the current PU is vertically or horizontally split into the non-square TUs;
deriving a first intra direction mode;
generating, based on a first prediction direction of the first intra direction mode, a prediction value of a first target sample in a current TU, among the non-square TUs;
deriving a first intra direction mode and first neighbor samples of a current TU;
determining a reference sample neighboring a second target sample within the current TU based on the first prediction direction of the first intra direction mode;
deriving second neighbor samples of a neighbor block to which the reference sample belongs;
determining a modified prediction direction based on a comparison between the reference sample and at least one of the second neighbor samples;
generating a prediction value of the second target sample in the current TU based on the modified prediction direction and the first neighbor samples; and
encoding image information including intra prediction mode information representing the first intra direction mode and the split flag information.

13. The method of claim 12, further comprising steps of:
deriving a neighbor sample 1 located in a prediction direction of a second intra direction mode of the neighbor block based on the reference sample from the second neighbor samples; and
deriving n neighbor samples from the second neighbor samples based on neighbor samples located within a specific distance from the neighbor sample 1,
wherein a direction indicative of a sample belonging to the n neighbor samples and having a smallest difference with the reference sample is determined to be the modified prediction direction based on a comparison between the n neighbor samples and the reference sample.

14. The intra prediction method of claim 13, wherein the modified prediction direction is determined based on an equation below, $$DirRefine(P_{ref}(x, y)) = \underset{m-r \leq a \leq m+r}{\operatorname{argmin}} \{|PREDP_{ref}(x,y)(a) - P_{ref}(x, y)|\}$$

wherein DirRefine($P_{ref}$(x,y)) is the modified prediction direction, PREDP$_{ref}$(x,y)(a) is one of the n neighbor samples, $P_{ref}$(x,y) is the reference sample, m is the prediction direction of the second intra direction mode, r is a positive integer, and the n is 2r−1.

15. The intra prediction method of claim 12, wherein based on the first intra direction mode being one of Nos. 2 to 17 intra prediction modes, the neighbor block is a left block of the current TU and the second target sample neighbors a left boundary of the current TU.

16. The intra prediction method of claim 15, wherein:
   based on a sample position of the target sample being (x,y) and the first intra direction mode being one of the Nos. 2 to 6 intra prediction modes, a sample position of the reference sample is (x−1,y+1),
   based on a sample position of the target sample being (x,y) and the first intra direction mode being one of the Nos. 7 to 13 intra prediction modes, a sample position of the reference sample is P(x−1,y), and
   based on a sample position of the target sample being (x,y) and the first intra direction mode being one of the Nos. 14 to 17 intra prediction modes, a sample position of the reference sample is (x−1,y−1).

17. The intra prediction method of claim 16, further comprising a step of deriving a prediction value of a sample belongs to samples of the current TU and located on a right side of the target sample based on the modified prediction direction.

\* \* \* \* \*